US010219246B2

(12) United States Patent
Phan et al.

(10) Patent No.: US 10,219,246 B2
(45) Date of Patent: Feb. 26, 2019

(54) MBSFN AREA CONFIGURATION IN SELF-ORGANIZING NETWORKS

(71) Applicant: TELEFONAKTIEBOLAGET LM ERICSSON (PUBL), Stockholm (SE)

(72) Inventors: Mai-Anh Phan, Herzogenrath (DE); Angelo Centonza, Stockholm (SE); Shabnam Sultana, Montreal (CA); Gino Luca Masini, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 296 days.

(21) Appl. No.: 15/090,767

(22) Filed: Apr. 5, 2016

(65) Prior Publication Data
US 2016/0302172 A1 Oct. 13, 2016

Related U.S. Application Data

(60) Provisional application No. 62/145,623, filed on Apr. 10, 2015.

(51) Int. Cl.
H04W 72/00 (2009.01)
H04L 1/00 (2006.01)
(Continued)

(52) U.S. Cl.
CPC ......... *H04W 72/005* (2013.01); *H04L 1/0003* (2013.01); *H04L 1/0005* (2013.01); *H04L 1/0009* (2013.01); *H04L 1/0011* (2013.01); *H04L 1/0015* (2013.01); *H04W 4/06* (2013.01); *H04L 2001/0093* (2013.01); *H04W 72/0433* (2013.01)

(58) Field of Classification Search
None
See application file for complete search history.

(56) References Cited

U.S. PATENT DOCUMENTS

2014/0247766 A1 9/2014 Zhang et al.
2015/0055541 A1 2/2015 Zhang et al.
(Continued)

FOREIGN PATENT DOCUMENTS

CN 102740230 A 10/2012

OTHER PUBLICATIONS

Ericsson. MBMS Enhancements and SON. 3GPP TSG-RAN WG3 #87bis R3-150757. Tenerife—Santa Cruz, Spain, Apr. 20-24, 2015.
(Continued)

*Primary Examiner* — Mohammad S Adhami
*Assistant Examiner* — Vladislav Y Agureyev

(57) ABSTRACT

A method in a multicast coordination entity is disclosed. The method comprises configuring a multimedia broadcast multicast service single frequency network (MBSFN) area, the MBSFN area comprising one or more cells, and receiving, from one or more network nodes, cell state information for the one or more cells, the cell state information indicating whether the one or more cells are active or inactive. The method further comprises determining, based on the cell state information, a modulation and coding scheme for an MBSFN transmission, and communicating the MBSFN area configuration and the determined modulation and coding scheme for the MBSFN transmission to the one or more network nodes.

26 Claims, 13 Drawing Sheets

(51) Int. Cl.
*H04W 4/06* (2009.01)
*H04W 72/04* (2009.01)

(56) References Cited

U.S. PATENT DOCUMENTS

| | | | |
|---|---|---|---|
| 2015/0223090 A1* | 8/2015 | Van Lieshout | H04W 24/08 370/252 |
| 2016/0073302 A1* | 3/2016 | Yang | H04W 36/0072 370/331 |
| 2016/0094358 A1* | 3/2016 | Won | H04L 12/1881 370/230 |
| 2016/0211980 A1* | 7/2016 | Zhu | H04W 4/06 |

OTHER PUBLICATIONS

3rd Generation Partnership Project; Technical Specification Group Radio Access Network; Study on next generation Self-Optimizing Network (SON) for UTRAN and E-UTRAN (Release 12). 3GPP TR 37.822 V12.1.0 (Mar. 2015).

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2. (Release 12) 3GPP TS 36.300 V12.4.0 (Dec. 2014).

3GPP TSG-RAN WG3 Meeting #87 R3-150391. Athens, Greece, Feb. 9-13, 2015.

Nokia. New WI on SON for AAS-based deployments. 3GPP TSG RAN Meeting #65 RP-141624 Edinburgh, Scotland, Sep. 9-12, 2014.

* cited by examiner

MBSFN AREA CONFIGURATION IN SELF-ORGANIZING NETWORKS

PRIORITY

This application claims the benefit under 35 U.S.C. § 119(e) of the priority of U.S. Provisional Application 62/145,623 filed on Apr. 10, 2015, entitled "MBSFN Area Configuration in Self-Organizing Networks," the entire disclosure of which is hereby incorporated by reference.

TECHNICAL FIELD

The present disclosure relates, in general, to wireless communications and, more particularly, to MBSFN area configuration in self-organizing networks.

BACKGROUND

In a typical cellular network, user equipment (UEs) communicate via a Radio Access Network (RAN) which can be connected to one or more core networks. A UE is a mobile terminal by which a subscriber can access services offered by an operator's network. The UE may, for example, be communication devices such as mobile telephones, cellular telephones, laptops or tablet computers, sometimes referred to as surf plates, with wireless capability. The UE may be portable, pocket-storable, hand-held, computer-comprised, vehicle-mounted mobile devices or any other suitable devices enabled to communicate voice and/or data, via the radio access network, with another entity (e.g., another mobile station or a server such as a content providing server).

UEs are enabled to communicate wirelessly in the cellular network. As described herein, a UE may include a processor, a memory, a transceiver, an antenna, and any other suitable components. In particular embodiments, some or all of the functionality described in this disclosure as being provided by UEs, machine-type-communication (MTC) or machine-to-machine (M2M) devices, and/or any other types of wireless communication devices may be provided by the device processor executing instructions stored on a computer-readable medium, such as the memory of the UE. Alternative embodiments of the wireless communication device may include additional components that may be responsible for providing certain aspects of the device's functionality, including any of the functionality described below and/or any functionality necessary to support the solution described herein.

The cellular network covers a geographical area which is divided into cell areas. Each cell area is served by a base station, such as a Radio Base Station (RBS), which sometimes may be referred to as an "eNB", "eNodeB", "NodeB", "B node", or Base Transceiver Station (BTS), depending on the technology and terminology used. As described herein, such a base station includes a processor, a memory, a transceiver, an antenna, and any other suitable components. In particular embodiments, some or all of the functionality described herein as being provided by a base station, a node B, an enhanced node B, and/or any other type of network node may be provided by the node's processor executing instructions stored on a computer-readable medium, such as the node's memory. Alternative embodiments of the base station may include additional components responsible for providing additional functionality, including any of the functionality identified below and/or any functionality necessary to support the solution described herein.

FIG. 1 illustrates an example architecture of an LTE system. As shown in FIG. 1, the LTE architecture includes a plurality of radio access nodes 115 (which may be interchangeably referred to as eNBs) and a plurality of evolved packet core nodes 130 (which may be interchangeably referred to as MME/S-GW or core network nodes). In addition, FIG. 1 illustrates the logical interfaces between eNBs 115 and between eNB 115 and MME/S-GW 130. As shown in the example of FIG. 1, an S1 interface connects eNBs 115 to MME/S-GW 130, while an X2 interface connects peer eNBs 115. In some cases, an example network may include one or more instances of wireless communication devices (e.g., conventional UEs, MTC/M2M UEs) and one or more radio access nodes (e.g., eNodeBs or other base stations) capable of communicating with these wireless communication devices along with any additional elements suitable to support communication between wireless communication devices or between a wireless communication device and another communication device (such as a landline telephone).

FIG. 2 illustrates an example management system for the example LTE architecture of FIG. 1. The node elements (NE) 115, also referred to as eNBs, are managed by one or more domain managers (DM) 205, also referred to as the operation and support system (OSS). DMs 205 may further be managed by a network manager (NM) 210. In the example of FIG. 2, two NEs 115 are interfaced by an X2 interface, whereas the interface between two DMs 205 is referred to as Itf-P2P. DMs 205 and NM 210 are interfaced by an Itf-N interface.

The management system may configure NEs 115, as well as receive observations associated to features in NEs 115. For example, in some cases DMs 205 observe and configure NEs 115, while NM 210 observes and configures DMs 205, as well as NEs 115 via DMs 205.

By means of configuration via DMs 205, NM 210 and related interfaces, functions over the X2 and S1 interfaces can be carried out in a coordinated way throughout the RAN, eventually involving the core network (i.e., MME and S-GWs 130 described above in relation to FIG. 1).

Multimedia Broadcast Multicast Service (MBMS), an example of a broadcast service, is a point-to-multipoint interface specification for existing and upcoming 3GPP cellular networks. MBMS is designed to provide efficient delivery of broadcast and multicast services, both within a cell as well as within the core network. For broadcast transmission across multiple cells, MBMS defines transmission via single frequency network configurations, also known as MBMS single frequency network (MBSFN) operation. Target applications include, for example, mobile TV and radio broadcasting, as well as file delivery and emergency alerts.

MBMS was introduced in 2005 for different types of RAN (i.e., for Global System for Mobile Communications (GSM), for Enhanced Data Rates for GSM Evolution (EDGE) RAN (GERAN), and for Universal Terrestrial RAN (UTRAN) Rel-6) and in 2010 (for Evolved UTRAN (E-UTRAN) Rel-9) for more efficient distribution of identical services (i.e., services that are identical for several users.

For MBMS, two new logical channels were introduced: the Multicast Control Channel (MCCH) and the Multicast Traffic Channel (MTCH). The MCCH carries information about MBMS specific transport channel configurations, in E-UTRAN (also referred to as Long Term Evolution (LTE)) the Multicast Channel (MCH), and the corresponding MBMS services, which are mapped one to one to an MTCH.

The MCCH contains information for the UE to be able to read a specific MBMS service. Both MCCH and MTCH are mapped to one or more MCHs. Each MCH can be configured with an individual modulation and coding scheme (MCS), and is selected according to the requirements of the control channels or the MBMS services that it carries, respectively.

In E-UTRAN, SystemInformationBlockType13 (SIB13), which is cell specific, contains information about MCCH configuration and scheduling, such that the UE can find and read the MCCH.

For MBMS, broadcast services are generally offered within a large geographic area consisting of one or more cells. In order to exploit this, these cells apply MBSFN operation, which means that identical signals are transmitted on the same time-frequency radio resources from each cell, such that the received signal power in the terminal (i.e., UE) is increased. The cells that offer the same set of MBMS services and the same scheduling of MBMS service sessions belong to one MBSFN area. The cells within the same MBSFN area transmit all MCHs within this MBSFN area in MBSFN mode (i.e., the corresponding MCCH and all MTCHs). In order to achieve MBSFN operation, one requirement is that the cells that belong to the same MBSFN area be tightly synchronized (e.g., in the order of microseconds).

From a terminal (i.e., UE) perspective, all signals transmitted from the cells within the MBSFN area combine over the radio resulting in an improved signal to interference and noise ratio (SINR). To protect the MBSFN signals from interference from surrounding cells, MBSFN area reserved cells are typically deployed at MBSFN area borders. MBSFN area reserved cells, however, are allowed to transmit other services on the resources allocated for the MBSFN transmission, but only with restricted power to avoid an unacceptable SINR degradation of the MBSFN signal. As the reserved cells do not transmit the broadcast service, the base station controlling the reserved cell requires less transmit power, which supports the idea of power efficient radio networks.

FIG. 3 illustrates an example E-UTRAN MBMS architecture. As shown in the example of FIG. 3, the architecture includes eNB 115, Multi-Cell/Multicast Coordination Entity (MCE) 305, Mobile Management Entity 310, and MBMS Gateway (GW) 315.

Typically, MCE 305 semi-statically configures which cells belong to the MBSFN area, and actively participates in the MBSFN transmission and in the determination of which cells are configured as reserved cells. MCE 305 also determines the MCS based on Quality of Service (QoS) requirements. MBSFN area configurations and MBMS scheduling information is provided from MCE 305 to eNBs 115 via the M2 interface (3GPP TS 36.443). The M2 interface is an E-UTRAN internal control plane interface. MCE 305 communicates with MME 310 over the M3 interface. The M3 interface is a control plane interface between E-UTRAN and the Evolved Packet Core (EPC). eNB 115 communicates with MBMS GW 315 via the M1 interface, a user plane interface.

In order to verify the actual MBSFN signal reception and properly configure MBSFN areas (such as the MBSFN area size or a set of modulation and coding schemes appropriate for specific services), support of MBSFN UE measurements was introduced in 3GPP Rel-12 utilizing the 3GPP Minimization of Drive Test (MDT) functionality. This feature is also known as MBMS MDT.

In order to better support critical communications, there is a 3GPP work item on MBMS Enhancements (SP-140883). In the TR phase, possible improvements to allow establishment of MBMS bearers using target area information (e.g., a list of cell identifiers), as distinct from using an MBMS Service Area, were considered. One option is that the application server (e.g., the Group Communication Service Application Server (GCS AS)), sends a list of cell identifiers to the Broadcast-Multicast Service Centre (BM-SC), which forwards this information to MCE 305. Based on the cell identifiers, MCE 305 will determine the MBSFN areas that have to participate in the MBMS service transmission. The cell identities of all cells within these MBSFN areas may then be reported back to the GCS AS. If the application server determines that new cells are supposed to provide the MBMS service, it can first check the broadcasting cell list before it sends a new request to the BM-SC. This avoids unnecessary signaling between the AS and the BM-SC.

Self-Organizing Networks (SON) enhancements have been studied in order to provide new features in LTE networks, such as different services, various UE types and dynamic deployment changes made possible as a result of wider usage of Active Antenna Systems (AAS). AAS in mobile communications are based on a combination of one or more antenna elements. The elements can be combined in different ways to focus the antenna transmission and reception with directivity. The antenna can transmit and receive more energy in some directions than in others.

AAS reconfiguration, based for example on OAM control or on distributed eNB-based logic, may include automatic cell splitting/merging/shaping, possibly even reusing Physical Cell Identifiers (PCIs)/E-UTRAN Cell Global Identifiers (ECGI) between old and newly activated cells (albeit with solutions to avoid PCI/ECGI ambiguities), and dynamically activating/deactivating cells. eNBs 115 may exchange information about cell state changes through X2 signaling (i.e., eNB CONFIGURATION UPDATE message sent after the change is taken into operational use). However, cell configuration change notifications are not foreseen to be communicated to the core network.

Similarly, cell reconfigurations involving activation/deactivation of cells can be adopted for energy saving purposes. In this case, cells would be activated/deactivated depending on UE density and traffic load in the area and according to energy saving targets. Such energy saving triggered changes in cell configurations are also notified between radio nodes via common interfaces such as the X2 interface.

As described above, MBSFN areas are typically semi-statically configured by MCE 305, which can optionally be based on MBSFN measurements performed by the UE. Obtaining an optimal MCS for a given service in a specific MBSFN area is rather complex as it involves multiple cells with different coverage. In SON, the process of activating/deactivating cells is something kept among eNBs 115, so all cells that are supported by the eNB (a cell can be active or dormant) may be considered active to an external node (i.e., MCE 305 may not be aware of dormant cells).

MCE 305 typically selects the MCS based on the assumption that all cells within the MBSFN participate in the MBSFN transmission. Such an approach, however, suffers from certain deficiencies. For example, because dormant cells do not participate in the MBSFN transmission, this will degrade the MBSFN signal strength, which may result in poor user experience. Furthermore, if MBSFN measurements were configured, the resulting measurement reports may cause misconfiguration of the MBSFN area. As one example, this may happen if the MBSFN signal was measured when all cells were active, such that an MCS with higher transmit rate is selected (if the cells are deactivated, there will be a degradation of the MBSFN signal). As another example, this may happen if the MBSFN signal was measured when there were dormant cells, such that a more robust MCS is selected resulting in lower transmit rate (if the dormant cells are activated, this will typically result in waste of resources).

SUMMARY

To address the foregoing problems with existing approaches, disclosed is a method in a multicast coordination entity. The method comprises configuring a multimedia broadcast multicast service single frequency network (MBSFN) area, the MBSFN area comprising one or more cells, and receiving, from one or more network nodes, cell state information for the one or more cells, the cell state information indicating whether the one or more cells are active or inactive. The method further comprises determining, based on the cell state information, a modulation and coding scheme for an MBSFN transmission, and communicating the MBSFN area configuration and the determined modulation and coding scheme for the MBSFN transmission to the one or more network nodes.

In certain embodiments, the method may further comprise sending a cell activity logging request to the one or more network nodes, the cell activity logging request requesting the one or more network nodes to begin logging cell state information for the one or more cells, and sending a logging results request to the one or more network nodes, the logging results request requesting the one or more network nodes to send the cell state information for the one or more cells to the multicast coordination entity. In certain embodiments, the method may further comprise informing an application layer server about the one or more cells in the MBSFN area that will potentially participate in the MBMS transmission regardless of whether they are active or dormant.

In certain embodiments, the method may further comprise determining one or more subsets of cells within the MBSFN area, each of the determined one or more subsets of cells within the MBSFN area having an associated sleep group level, and communicating an allowed sleep group level to the one or more network nodes, the allowed sleep group level indicating an allowed sleep group, the allowed sleep group comprising one or more of the determined one or more subsets of cells within the MBSFN area that can be deactivated. The method may further comprise configuring one or more cells not included in the allowed sleep group to participate in the MBSFN transmission while being otherwise deactivated.

In certain embodiments, the allowed sleep group level communicated to the one or more network nodes may comprise a first sleep group level, and the method may further comprise receiving, from one or more of the network nodes, one or more requests to change the allowed sleep group level from the first sleep group level to a second sleep group level. The first sleep group level may be associated with a first subset of cells within the MBSFN area and the first sleep group level may indicate that the first subset of cells within the MBSFN area can be deactivated. The second sleep group level may be associated with a second subset of cells within the MBSFN area and the second sleep group level may indicate that both the second subset of cells within the MBSFN area and the first subset of cells within the MBSFN area can be deactivated. The method may further comprise communicating, to the one or more network nodes, the second sleep group level as the allowed sleep group level in response to the received one or more requests to change the allowed sleep group level from the first sleep group level to the second sleep group level.

Also disclosed is a multicast coordination entity. The multicast coordination entity comprises one or more processors. The one or more processors are configured to configure a multimedia broadcast multicast service single frequency network (MBSFN) area, the MBSFN area comprising one or more cells. The one or more processors are configured to receive, from one or more network nodes, cell state information for the one or more cells, the cell state information indicating whether the one or more cells are active or inactive, and determine, based on the cell state information, a modulation and coding scheme for an MBSFN transmission. The one or more processors are configured to communicate the MBSFN area configuration and the determined modulation and coding scheme for the MBSFN transmission to the one or more network nodes.

Also disclosed is a method in a network node. The method comprises determining whether one or more cells associated with the network node are active or inactive, and communicating, to a multicast coordination entity, cell state information for the one or more cells associated with the network node, the cell state information indicating whether the one or more cells associated with the network node are active or inactive. The method further comprises receiving, from the multicast coordination entity, a multimedia broadcast multicast service single frequency (MBSFN) area configuration and a modulation and coding scheme for an MBSFN transmission, the modulation and coding scheme determined based on the cell state information communicated to the multicast coordination entity, and transmitting the MBSFN transmission using the received modulation and coding scheme.

In certain embodiments, the method may further comprise receiving a cell activity logging request from the multicast coordination entity, the cell activity logging request requesting the network node to begin logging cell state information for the one or more cells associated with the network node. The method may further comprise receiving a logging results request from the multicast coordination entity, the logging results request requesting the one or more network nodes to send the logged cell state information for the one or more cells to the multicast coordination entity, and sending the logged cell state information to the multicast coordination entity in response to the received logging results request.

In certain embodiments, the method may further comprise receiving, from the multicast coordination entity, an allowed sleep group level, the allowed sleep group level indicating an allowed sleep group, the allowed sleep group comprising one or more subsets of cells within the MBSFN area that can be deactivated. The method may further comprise deactivating one or more cells of the one or more cells associated with the network node, the deactivated one or more cells included in at least one of the one or more subsets of cells included in the allowed sleep group.

In certain embodiments, the received allowed sleep group level may comprise a first sleep group level, and the method may further comprise communicating, to the multicast coordination entity, a request to change the allowed sleep group level from the first sleep group level to a second sleep group level. The first sleep group level may be associated with a first subset of cells within the MBSFN area and the first sleep group level may indicate that the first subset of cells within the MBSFN area can be deactivated. The second sleep group level may be associated with a second subset of cells within the MBSFN area and the second sleep group level may indicate that both the second subset of cells within the MBSFN area and the first subset of cells within the MBSFN area can be deactivated. The method may further comprise receiving, from the multicast coordination entity, the second sleep group level as the allowed sleep group level in response to the communicated request to change the allowed sleep group level from the first sleep group level to the second sleep group level, and deactivating one or more cells of the one or more cells associated with the network node, the deactivated one or more cells included in at least one of the first subset of cells associated with the first sleep group level and the second subset of cells associated with the second sleep group level.

Also disclosed is a network node. The network node comprises one or more processors. The one or more processors are configured to determine whether one or more cells associated with the network node are active or inactive, and communicate, to a multicast coordination entity, cell state information for the one or more cells associated with the network node, the cell state information indicating whether the one or more cells associated with the network node are active or inactive. The one or more processors are configured to receive, from the multicast coordination entity, a multimedia broadcast multicast service single frequency (MBSFN) area configuration and a modulation and coding scheme for an MBSFN transmission, the modulation and coding scheme determined based on the cell state information communicated to the multicast coordination entity, and transmit the MBSFN transmission using the received modulation and coding scheme.

Certain embodiments of the present disclosure may provide one or more technical advantages. For example, in certain embodiments an optimal MBSFN area configuration can be determined. As another example, in certain embodiments a preconfigured set of cells may be used, which may advantageously make it simpler for the MCE to select a set of modulation and coding schemes for the MCHs. As still another example, certain embodiments may allow for energy savings, which can be achieved because the cell only participates in the MBSFN transmission in the MBSFN subframes, and does not transmit synchronization signals, cell-specific reference signals, system information, etc. As yet another example, certain embodiments may avoid unnecessary signaling between the application server and the MCE by informing an application layer server about all cells, regardless of whether they are active or dormant, but which will potentially participate in the MBMS service transmission. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
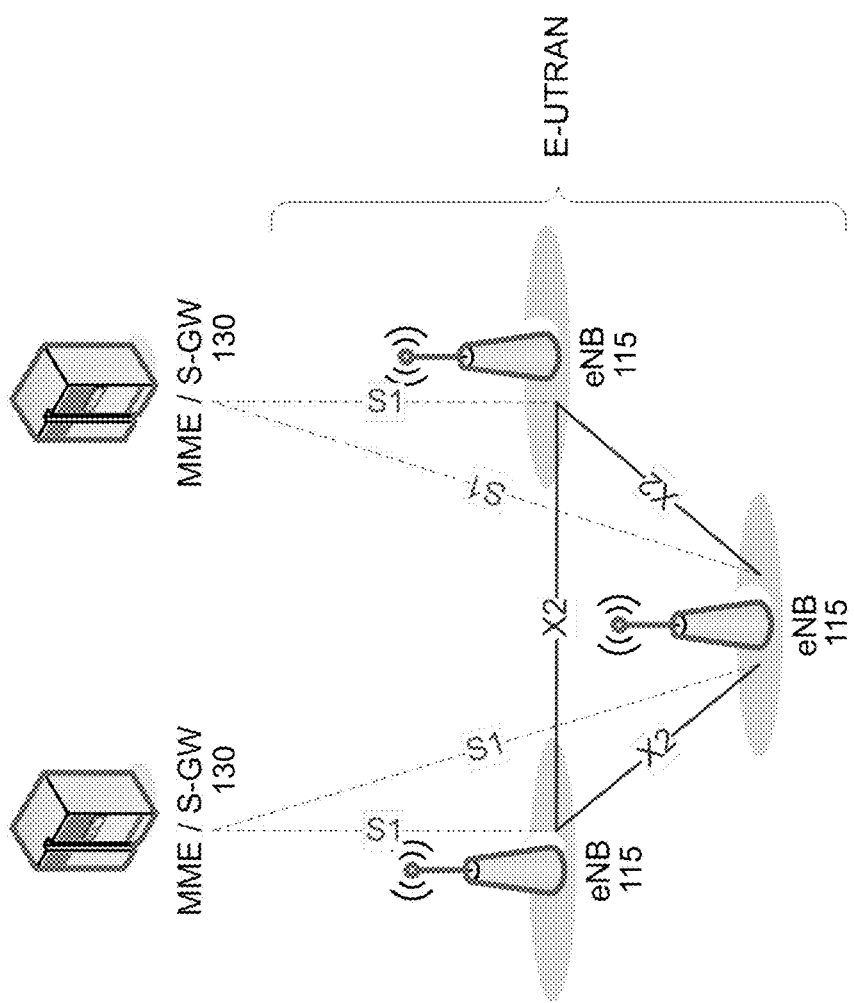
FIG. 1 illustrates an example architecture of an LTE system.
Figure 2:
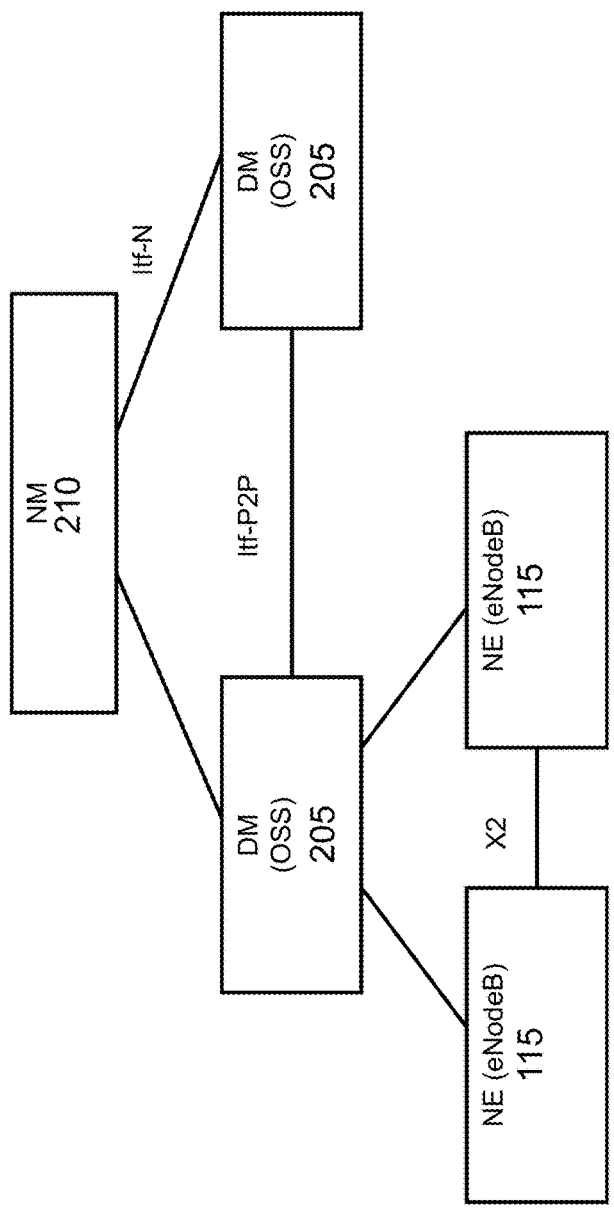
FIG. 2 illustrates an example management system for the example LTE architecture of FIG. 1.
Figure 3:
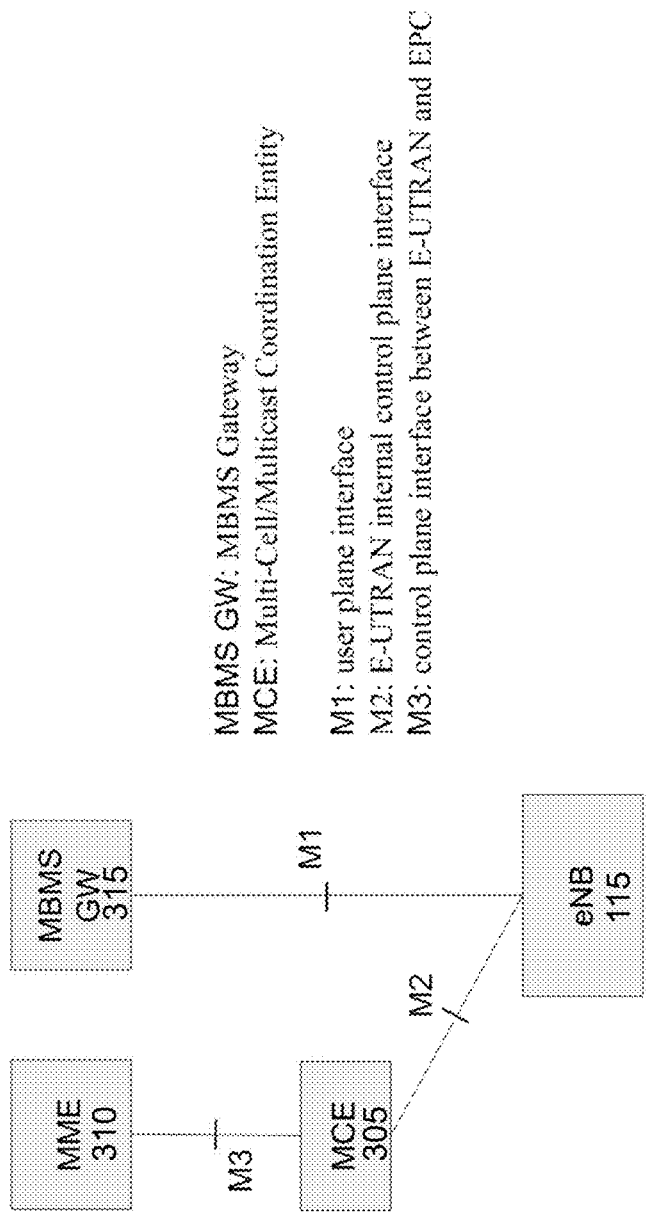
FIG. 3 illustrates an example E-UTRAN MBMS architecture.

As described above, the MCE typically selects the MCS for an MBSFN transmission based on the assumption that all cells within the MBSFN area participate in the MBSFN transmission. Since dormant cells do not participate in the MBSFN transmission, this will degrade the MBSFN signal strength, which may result in poor user experience. Furthermore, if MBSFN measurements were configured, the resulting measurement reports may cause misconfiguration of the MBSFN area. The present disclosure contemplates various embodiments that may address these and other deficiencies associated with existing approaches. In certain embodiments, this is achieved by informing the MCE about the state of the cells (i.e., whether they are active or inactive (i.e., dormant)). Based on that, the MCE may make a decision with respect to which MCS to select for the MCHs.

For example, in certain embodiments a method in an MCE is disclosed. The MCE may configure an MBSFN area comprising one or more cells. The MCE may receive, from one or more network nodes, cell state information for the one or more cells. The cell state information may indicate, for example, whether the one or more cells are active or inactive. Based on the cell state information, the MCE determines an MCS for an MBSFN transmission, and communicates the MBSFN area configuration and the determined MCS for the MBSFN transmission to the one or more network nodes.

As an arbitrary activation and deactivation of cells will increase the decision complexity in the MCE (and may also result in coverage holes within the MBSFN), in certain embodiments only a set of cells may be deactivated. Furthermore, it may also be desirable to define several sets of cells that may be subsequently configured as dormant cells, and to introduce a cell configuration option, referred to as MBSFN area supporting cells, in which the cell is basically dormant, but does participate in MBSFN transmissions. Thus, in certain embodiments the MCE may determine one or more subsets of cells within the MBSFN area, each of the determined one or more subsets of cells within the MBSFN area having an associated sleep group level. The MCE may communicate an allowed sleep group level to the one or more network nodes. The allowed sleep group level indicates an allowed sleep group, which comprises one or of the determined one or more subsets of cells within the MBSFN area that can be deactivated. In addition, the MCE may configure one or more cells not included in the allowed sleep group to participate in the MBSFN transmission while being otherwise deactivated.

In some cases, it may also be desirable for the MCE to inform an application layer server (e.g., the Group Communication Service Application Server (GCS AS)), about all cells within the MBSFN area regardless of whether they are active or dormant at the time of reporting. Thus, in certain embodiments the MCE may inform an application layer server about the one or more cells in the MBSFN area that will potentially participate in the MBSFN transmission regardless of whether they are active or dormant.

Also disclosed is a method in a network node. In certain embodiments, a network node determines whether one or more cells associated with the network node are active or inactive. The network node communicates, to the MCE, cell state information for the one or more cells associated with the network node, the cell state information indicating whether the one or more cells associated with the network node are active or inactive. The network node receives, from the MCE, an MBSFN area configuration and an MCS for an MBSFN transmission. The MCS is determined based on the cell state information communicated to the multicast entity. The network node transmits the MBSFN transmission using the received MCS.

As noted above, it may be desirable to define several sets of cells that may be subsequently configured as dormant cells, and to introduce a cell configuration option, referred to as MBSFN area supporting cells, in which the cell is basically dormant but does participate in the MBSFN transmissions. Thus, in certain embodiments the network node may receive, from the MCE, an allowed sleep group level that indicates an allowed sleep group comprising one or more subsets of cells within the MBSFN area that can be deactivated. In some cases, the network node may deactivate one or more cells of the one or more cells associated with the network node, the deactivated one or more cells included in at least one of the one or more subsets of cells included in the allowed sleep group.

Thus, the various embodiments described herein provide the MCE with information about the state of the cells (active/dormant) that are part of the MBSFN area, and advantageously allow the MCE to preconfigure several sets of cells that may be deactivated. With this approach, an optimal MBSFN area configuration corresponding to the service requirements can be met. Moreover, with a preconfigured set of cells, it may be simpler for the MCE to select a set of modulation and coding schemes for the MCHs.

In some cases, the concept of MBSFN area supporting cells may advantageously allow further energy savings. These energy savings can be achieved because the supporting cell only participates in the MBSFN transmission in the MBSFN subframes, but does not transmit synchronization signals, cell-specific reference signals, system information etc. Informing an application layer server about all cells, regardless of whether they are active or dormant, but which will potentially participate in the MBMS service transmission, avoids unnecessary signaling between the application server and the MCE as also dormant cells are supposed to be within the coverage area of the MBSFN transmission.

Figure 4:
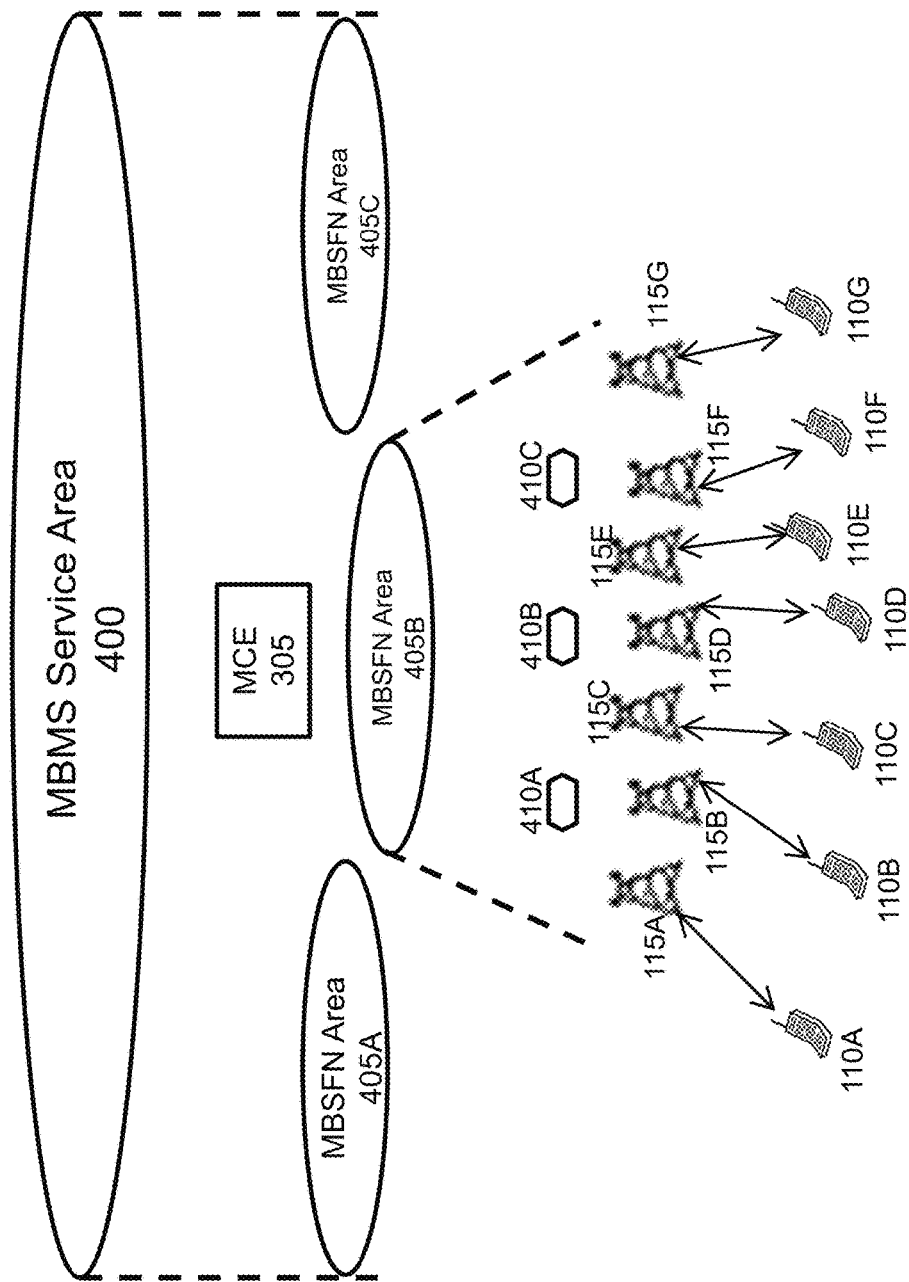
FIG. 4 illustrates an example wireless communication network, in accordance with certain embodiments.

FIG. 4 illustrates an example wireless communication network, in accordance with certain embodiments. The example network of FIG. 4 includes a plurality of wireless device 110A-G and a plurality of network nodes 115A-G within MBMS service area 400. MBMS service area 400 includes a plurality of MBSFN areas 405, including MBSFN area 405A, MBSFN area 405B, and MBSFN area 405C. MBSFN service area 400 and MBSFN areas 405 may be configured by MCE 305. MCE 305 may be included in the network in any suitable manner. For example, in certain embodiments MCE 305 may be part of a distributed MCE architecture in which MCE 305 may be part of a network node, such as one or more of network nodes 115A-G described in more detail below. As another example, in certain embodiments MCE 305 may be included as part of a centralized MCE architecture, and MCE 305 may be a logical entity. In such a configuration, MCE 305 may be a logical entity and may be deployed as a separate physical entity or located within another physical entity, such as, for example, a network node 115.

In some embodiments, an area of wireless signal coverage associated with a network node 115 may be referred to as a cell. Thus, each network node 115 may have one or more cells associated with it. Within an MBSFN area 405, there may be any suitable number of reserved cells. In the example shown in FIG. 4, MBSFN area 405B includes reserved cells 410A, 410B, and 410C. Each of reserved cells 410A-C may be associated with a network node 115. For example, reserved cell 410A may be associated with network node 115A, reserved cell 410B may be associated with network node 115D, and reserved cell 410C may be associated with network node 115F.

As used herein, a cell that is configured at the radio node but is not in use can be interchangeably referred to as "dormant", "sleeping", "inactive" or "deactivated," while a cell that is in use by the radio node can be denoted as "active." In the following, a cell supporting a "sleep mode" denotes a cell that is configured by the radio node, but may be activated or deactivated. The cell could thus be "active" or "dormant."

MCE 305 may semi-statically configure which cells belong to an MBSFN area 405, and may actively participate in the MBSFN transmission and in the determination of which cells are configured as reserved cells (e.g., reserved cells 410A, 410B, and 410C). MCE 305 may also determine the MCS based on QoS requirements. MBSFN area configurations and MBMS scheduling information is provided from MCE 305 to eNBs 115 via the M2 interface (3GPP TS 36.443). The M2 interface is an E-UTRAN internal control plane interface.

Each MBSFN area 405, such as MBSFN area 405B, may include a plurality of wireless devices 110 (which may interchangeably be referred to as UEs 110) and network nodes 115 (which may be interchangeably referred to as eNBs 115). In the example shown in FIG. 4, MBSFN area 405 includes wireless devices 110A-G and network nodes 115A-G. Wireless devices 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, wireless devices 110 may have device-to-device (D2D) capability. Thus, wireless devices 110 may be able to receive signals from and/or transmit signals directly to another wireless device. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the RAN. In certain embodiments, network nodes 115 may interface with one or more network nodes over an internode interface. For example, network nodes 115A and 115B may interface over an X2 interface.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on).

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of wireless device 110, network nodes 115, and other network nodes (such as radio network controller or core network node) are described in more detail below with respect to FIGS. 9-13.

Although FIG. 4 illustrates a particular arrangement of a wireless communication network, the present disclosure contemplates that the various embodiments described herein may be applied to a variety of networks having any suitable configuration. For example, the network may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In order to allow SON and MBSFN area configuration to work together in the same network, some restrictions have to be introduced to the SON functionality. Furthermore, in order to allow for an optimized MBSFN area configuration, sufficient knowledge on the cells that are actively participating in the MBSFN transmission within an MBSFN area 405, such as MBSFN area 405B, is essential.

In certain embodiments, MCE 305 may configure an MBSFN area comprising one or more cells, such as MBSFN area 405B. MCE 305 may receive, from one or more network nodes 115, cell state information for the one or more cells. The cell state information may include any suitable information. For example, in certain embodiments the cell state information may indicate whether the one or more cells are active or inactive.

In some cases, MCE 305 may send a cell activity logging request to network nodes 115. The cell activity logging request requests network nodes 115 to begin logging cell state information for the one or more cells. Network nodes 115 may determine whether one or more cells associated with network nodes 115 are active or inactive in response to receiving the cell activity logging request. In some cases, MCE 305 may send a logging results request to network nodes 115. The logging results request requests network nodes 115 to send the cell state information for the one or more cells to MCE 305. In response to receiving the logging results request from MCE 305, network nodes 115 may send the logged cell state information to MCE 305.

MCE 305 may determine, based on the cell state information, an MCS for an MBSFN transmission. MCE 305 may communicate the MBSFN area configuration and the determined MCS for the MBSFN transmission to network nodes 115.

MBSFN area reserved cells, such as MBSFN area reserved cells 410A-C, neither transmit MBMS related system information nor do they participate in the MBSFN transmission. Therefore, MBSFN area reserved cells 410 are typically only deployed at the border of an MBSFN area 405 in order to protect the MBSFN signal from interference caused by cells that are adjacent to the MBSFN area 405. Since MBSFN area reserved cells 410 do not contribute to the MBSFN transmission, they can be deactivated by SON without having any impact on the MBSFN signal quality. If MBSFN area reserved cells 410 are dormant, they will still serve as a kind of buffer zone that protects the MBSFN signal from neighboring MBSFN areas 405, such as MBSFN areas 405A and 405C, or neighbor cells carrying unicast transmissions in the subframes that are used for MBSFN transmissions within an MBSFN area 405.

In SON, redundant cells can be deactivated if sufficient coverage can be provided by the neighboring cells. Alternatively, cells can be deactivated and replaced by multiple cells (splitting) or replaced by a fewer number of cells (merging) for the purpose of optimizing coverage and capacity. In unicast transmission mode, this can easily be achieved by adaptive antenna reconfigurations, beamforming, link adaptation, etc. However, deactivating a cell that is currently participating in an MBSFN transmission cannot be dynamically compensated.

There are a number of different options for interworking between SON and MBSFN area reconfiguration. As one example, if the SON functionality is more dynamic than allowed for the MBSFN area reconfiguration, eNB 115 will only inform MCE 305 about cells that may be activated/deactivated. As another example, in some cases SON is rather slow and frequent MBSFN area configurations are accepted by the operator.

For both options, the eNB MBMS Configuration Data Item that is provided from eNB 115 to MCE 305 in the M2 SETUP and the eNB CONFIGURATION UPDATE messages can be extended to include cell state information. The cell state information can include any suitable information. For example, in certain embodiments the cell state information may include cell activity information, such as whether the sleep mode is supported in a cell (i.e., the cell can be activated and deactivated dynamically) and if so, whether the cell is active or dormant. In another example embodiment, it is possible that deactivated cells would only participate in the MBSFN transmissions (i.e., they could be MBSFN area supporting cells), in order to achieve the wanted MBSFN signal strength required by MCE 305. In such a case, MCE 305 knows that these cells are deactivated, but towards UEs 110, they would not be visible (no cell-specific reference signals, no system information). With such information, MCE 305 knows how it can configure the MBSFN transmission, and on the other hand, it knows that MBSFN measurements cannot be performed according to the MBMS MDT concept as a UE 110 could not properly report the E-UTRAN Cell Global Identifier (ECGI). In other words, MCE 305 would consider that no MBSFN measurements could be matched to dormant cells in the measurement report as UEs 110 would not receive the corresponding ECGI information, but could potentially use the location information which might optionally be provided in the UE's measurement report.

The cell state information may be communicated to MCE 305 in any suitable manner. As one example, in certain embodiments a new information element (IE) may be added to the eNB MBMS Configuration Data Item IE shown in the data structure below. This new information element could specify whether a cell is active or dormant. For example: 9.2.1.12 eNB MBMS Configuration Data Item (this Information Element Provides MBMS Related Configuration Information from eNB 115).

| IE/Group Name | Presence | Range | IE type and reference | Semantics description |
|---|---|---|---|---|
| E-UTRAN CGI | M | | 9.2.1.11 | |
| MBSFN Synchronisation Area Id | M | | 9.2.1.20 | |
| MBMS Service Area List | | 1 | | |
| >MBMS Service Area Item | | 1 to <maxnoofMBMSServiceAreasPerCell> | | |
| >>MBMS Service Area | M | | 9.2.3.6 | |
| Sleep Mode Supported | O | 1 | | Present if the sleep mode is supported |
| >Cell Activity State | O | | ENUMERATED (active, dormant, . . .) | |
| >MBSFN Supporting Cell | O | 1 | | |

| Range bound | Explanation |
|---|---|
| maxnoofMBMSServiceAreasPerCell | Maximum no. of Service Areas per cell. The value for maxnoofMBMSServiceAreasPerCell is 256. |

Another way to communicate which cells are active or inactive is to signal to the MCE a configuration index IE. Such configuration index may point at a set of active cells that have been pre-configured for example either by a central node such as OAM or by means of learning periods and history information about cells that are active after the index is signaled. This new IE may be signaled as part of the M2 SETUP and the eNB CONFIGURATION UPDATE messages and it could take the following form:

| IE/Group Name | Presence | Range | IE type and reference | Semantics description |
|---|---|---|---|---|
| Cell Configuration Indication | O | | INTEGER (0 . . . 255, . . .) | Indicates the cell configuration adopted by the eNB |

In one example embodiment, each integer value of the index indicates be a specific set of active and dormant cells. Therefore each index identifies the set of cells that are active at the same time.

With dynamic SON configuration in a semi-statically configured MBSFN area, if the operator does not wish to reconfigure an MBSFN area 405 upon each SON reconfiguration, it is in principle sufficient to inform MCE 305 only once about cells that can be deactivated. The IE "Sleep Mode Supported" will be present. With this information, MCE 305 can select the MCS for the worst case (i.e., all cells that support the sleep mode are in a dormant state during the MBSFN transmission).

For MBSFN measurements, however, it would be important for MCE 305 to know which cells within an MBSFN area 405, such as MBSFN area 405B, were active and which ones were dormant in order to verify the MBSFN signal quality. Therefore, it may be desirable for MCE 305 to be able to initialize and stop cell activity state updates from eNBs 115. As such knowledge is not needed for dynamic reconfigurations, it would be sufficient to log such information in an eNB 115 when initialized and send the cell activity states over time only at the end of such a measurement period (i.e., when MCE 305 stops the cell activity logging). In order to avoid frequent signaling via M2, cell activity state information could be collected in eNBs 115 and sent in a single message to MCE 305 at a later stage when requested.

In certain embodiments, the MCE CONFIGURATION could be extended to initialize/stop the cell activity logging. Because this typically implies changes on MCCH related BCCH and would require redundant transmission of information, it may be more appropriate to introduce a new message procedure similar to the MBMS COUNTING procedure. Thus, in certain embodiments a new Cell Activity Logging procedure sent from MCE 305 to eNB 115 is introduced to initiate the logging and one procedure to request the cell activity logging results.

Figure 5:
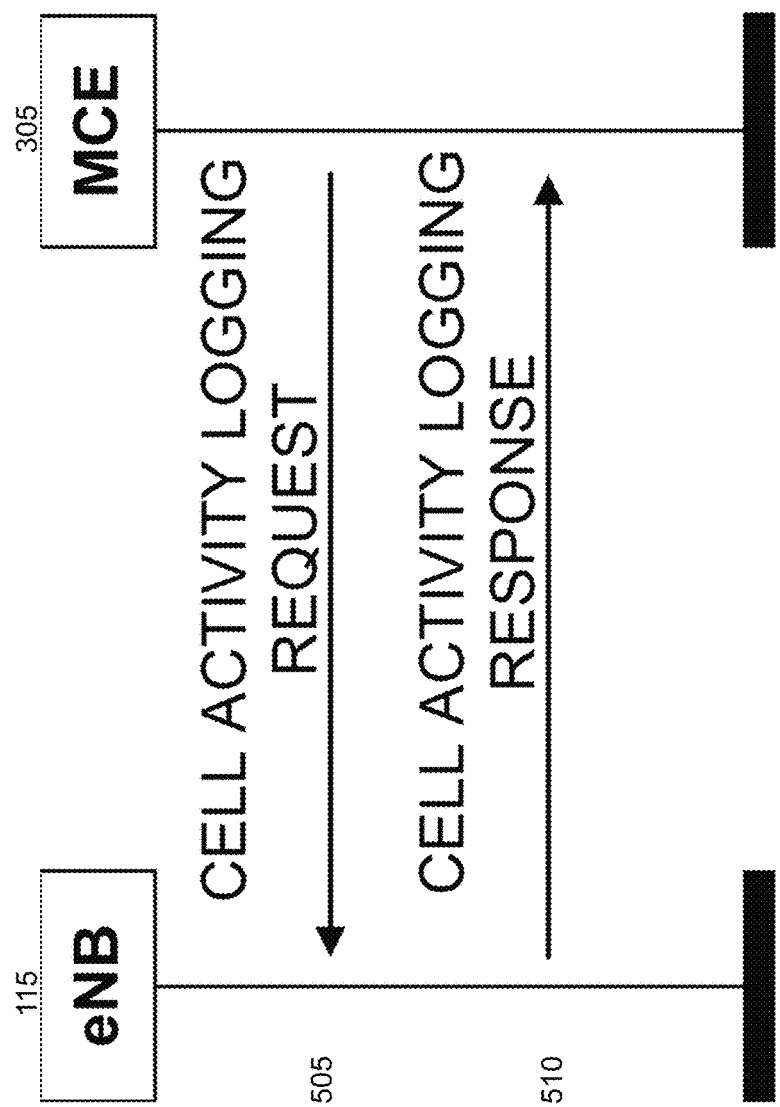
FIG. 5 is a signal flow diagram illustrating a cell activity logging procedure for initiating logging by a network node, in accordance with certain embodiments.

FIG. 5 is a signal flow diagram illustrating a cell activity logging procedure for initiating logging by a network node, in accordance with certain embodiments. At step 505, MCE 305 sends a cell activity logging request message to eNB 115. The cell activity logging request message is sent by MCE 305 to request that eNB 115 start cell activity logging. For example:

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cell Activity Logging Request | M | | | | YES | reject |

At step 510, eNB 115 sends a cell activity logging response message to MCE 305. The cell activity logging response message is sent by eNB 115 to acknowledge the cell activity logging request message sent at step 505. For example:

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Criticality Diagnostics | O | | 9.2.1.7 | | YES | ignore |

Figure 6:
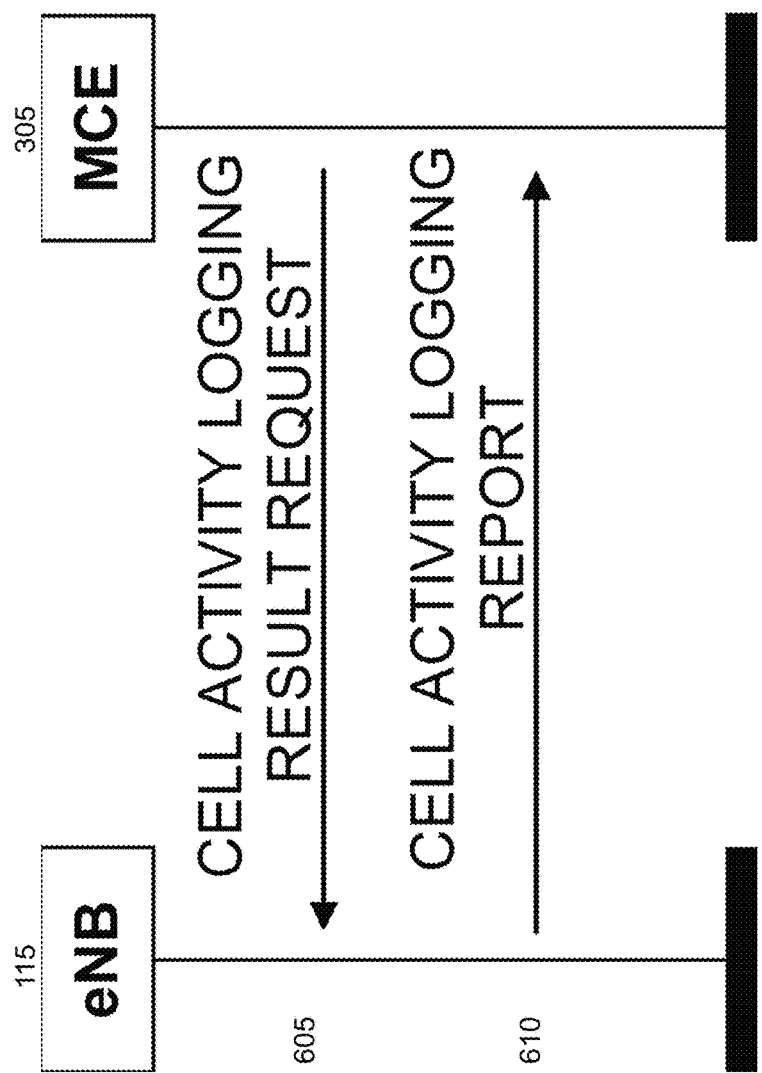
FIG. 6 is a signal flow diagram illustrating a cell activity logging results reporting procedure, in accordance with certain embodiments.

FIG. 6 is a signal flow diagram illustrating a cell activity logging results reporting procedure, in accordance with certain embodiments. At step 605, MCE 305 sends a logging results request to eNB 115. The logging results request message is sent by MCE 305 to request that eNB 115 send the cell activity logging results. The cell activity logging continuation IE (shown in the table below) further requests eNB 115 to reset and either continue or discontinue the logging. For example:

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cell Activity Logging Result Request | M | | | | YES | reject |
| Cell Activity Logging Continuation | M | | ENUMERATED (continue, stop, . . .) | | YES | reject |

At step 610, eNB 115 sends a cell activity logging report message to MCE 305. The cell activity logging report message is sent by eNB 115 to MCE 305 to report the results of the cell logging activity. For example:

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cell Activity Logging Report | M | | | | YES | reject |
| Absolute Time Info | M | | BIT STRING (SIZE(48)) | | YES | reject |
| Cell Activity State List | | 1 to <maxnoofCells> | | | EACH | reject |
| >Cell Activity State | M | | ENUMERATED (dormant, active, . . .) | | | |
| >Relative Time Stamp | M | | INTEGER (0 . . . 7200), | | | |

The Absolute Time Info IE shown above is, for example, defined in TS 36.331: AbsoluteTimeInfo: The IE Absolute-TimeInfo indicates an absolute time in a format YY-MM-DD HH:MM:SS and using BCD encoding. The first/leftmost bit of the bit string contains the most significant bit of the most significant digit of the year and so on.

The Relative Time Stamp IE indicates the time of logging the cell activity, measured relative to the AbsoluteTimeInfo value in seconds. Which unit to use depends on how often cell activity could be changed. The unit could in principle also be in milliseconds, but this would require a larger range. The range for the relative time stamp can be discussed in 3GPP or left on implementation with standards allowing some maximum value. In this description, the failure cases follow the principles in TS 36.443.

If the operator wants to update the MBSFN area configuration upon changes caused by SON, both the Sleep Mode Supported IE and Cell Activity State IE have to be provided to MCE 305 so that it can take proper decisions for the MCS selection. However, increasing the robustness of a transmission for all MCHs could result in an increased number of allocated radio resources and thus, information changes on SIB2. On the other hand, it would be possible to allocate MBSFN subframes according to the worst case, and reconfiguration with less robust MCS would then allow TM9/10 UEs to reuse unused MBSFN subframes.

Based on statistics or MBSFN measurement results and available MBSFN subframe resources, the MCE may implicitly determine a set of cells that cannot be deactivated and thus, put some restrictions on SON. For example, different sets of cells belonging to different "sleep group levels" are defined such that they can be deactivated at different stages according to, for example, an "Allowed Sleep Level" that is selected by the MCE.

For example, in certain embodiments MCE 305 may determine one or more subsets of cells within an MBSFN area, such as MBSFN area 405B. Each of the determined one or more subsets of cells within MBSFN area 405B may have an associated sleep group level. MCE 305 may communicate an allowed sleep group level to network nodes 115. The allowed sleep group level may indicate an allowed sleep group. The allowed sleep group may comprise one or more of the determined one or more subsets of cells within MBSFN area 405B that can be deactivated.

The allowed sleep levels may be defined in any suitable manner. For example, in certain embodiments the allowed sleep levels may be defined as follows:

Allowed sleep level 1: only cells belonging to sleep group level 1 (e.g., only reserved cells) can be deactivated;

Allowed sleep level 2: a set of cells with sleep group level 2 can be deactivated in addition to the cells belonging to sleep group level 1;

Allowed sleep level 3: another set of cells with sleep group level 3 can additionally be deactivated;

Allowed sleep level X: another set of cells with sleep group level X can additionally be deactivated to all previous levels.

The number of allowed sleep levels may be determined in any suitable manner and may vary according to particular implementations. An example of 8 sleep levels is shown in the table below. An eNB may request the MCE to increase the allowed sleep level so that, for example, the MCE may choose a more robust MCS for the MBSFN transmissions. In certain embodiments, if the MCE receives sufficient requests from the eNBs, the MCE may decide to reconfigure the MBSFN areas (such as MBSFN area 405B described above in relation to FIG. 4). After the reconfiguration, the MCE may grant the eNB to activate/deactivate the cells corresponding to sleep group levels lower or equal to the allowed sleep level dynamically. For example, if the allowed sleep level is 2, SON may be allowed to dynamically activate or deactivate all cells belonging to sleep group levels 0, 1, and 2.

Such requests may be based on any suitable criteria. For example, in certain embodiments such requests may be based on the load situation. With less unicast traffic, it would also be acceptable to allocate more MBSFN subframes (using more robust MCS resulting in smaller transport block sizes) for the MBMS transmissions in all cells.

Alternatively, the Allowed Sleep Level could be replaced with "system load level" or similar. The Allowed Sleep Level can be signaled in the MCCH related BCCH Configuration Item, which can be sent from the MCE to the eNB in the M2 SETUP RESPONSE, ENB CONFIGURATION UPDATE ACKNOWLEDGE and in the MCE CONFIGURATION UPDATE. For example:

9.2.1.13 MCCH Related BCCH Configuration Item

This information element provides MCCH related BCCH configuration information to the eNB.

| IE/Group Name | Presence | Range | IE type and reference | Semantics description |
|---|---|---|---|---|
| MBSFN Area Id | M | | 9.2.1.14 | |
| PDCCH Length | M | | ENUMERATED (s1, s2, . . .) | This IE is encoded along the number of OFDM symbols for PDCCH as of table 6.7-1. in TS 36.211 [12]. |
| Repetition Period | M | | ENUMERATED (rf32, rf64, rf128, rf256) | The same encoding as the mcch-RepetitionPeriod IE in the mcch-Config IE as specified in TS 36.331 [11]. |
| Offset | M | | INTEGER (0 . . . 10) | The same encoding as the mcch-Offset in mcch-Config IE as specified in TS 36.331 [11]. |
| Modification Period | M | | ENUMERATED (rf512, rf1024) | The same encoding as the mcch-ModificationPeriod IE in the mcch-Config IE as specified in TS 36.331 [11]. |
| Subframe Allocation Info | M | | BIT STRING (SIZE(6)) | The same encoding as the sf-AllocInfo IE specified in TS 36.331 [11]. |
| Modulation and Coding Scheme | M | | ENUMERATED (n2, n7, n13, n19) | The same encoding as the signallingMCS IE specified in TS 36.331 [11]. |
| Cell Information List | | 0 . . . 1 | | |
| >Cell Information | | 1 to <maxnoofCells> | | |
| >>E-UTRAN CGI | M | | 9.2.1.11 | |
| >>Cell Reservation Info | M | | ENUMERATED (reservedCell, nonReservedCell, . . .) | |
| >> Sleep Group Level | O | | INTEGER (1 . . . maxnoofSleepGroupLevels) | |
| >Allowed Sleep Level | O | | INTEGER (1 . . . maxnoofSleepGroupLevels) | |
| > MBSFN Support Info | O | 1 | | |

| Range bound | Explanation |
|---|---|
| maxnoofCells | Maximum no. of cells that may be served by an eNB. The value for maxnoofCells is 256. |
| maxnoofSleepGroupLevels | Maximum no. of sleep group levels that may be configured by the MCE. The maxnoofSleepGroupLevels is 8 (FFS). |

If the MCE waits for several requests from the eNB, the increase of the Allowed Sleep Level will typically be done in the MCE CONFIGURATION UPDATE.

Optionally, if the MCE does not plan to perform MBMS MDT, it would be possible to allow the cell to be partly deactivated (i.e., if a cell's Sleep Group Level is higher than the Allowed Sleep Level, the cell could be deactivated, but it still has to participate in the MBSFN transmissions). This allows for some energy saving as the cell does not have to send system information, synchronization signals and cell specific reference signals.

On the other hand, if the cell load increases dormant cells can be reactivated. However, if the amount of radio resources is not sufficient, the eNB might request a decrease of the sleep level by sending, for example, the wanted sleep level. With a lower sleep level resulting in more cells participating in the MBSFN transmission, the MCE knows that the MBSFN signal will be stronger and that it can increase the transmit rate by choosing a less robust MCS resulting in larger transport block sizes and thus, use less MBSFN subframes. As a result, more radio resources can be used for unicast (e.g., by reusing unused MBSFN subframes or, which results in system information changes and therefore may be less desirable, by reducing the number of MBSFN subframes in SystemInformationBlockType2). Alternatively, if these radio resources are not used in the cell, the power amplifier can enter micro sleep mode for a longer time as no transmission is performed in the unused MBSFN subframes.

The concept of MBSFN area supporting cells may allow even further energy savings, where energy savings can be achieved because dormant cells which would enable a more efficient MCS to be used can be identified. Since the usage of a more efficient MCS would decrease the amount of time data is scheduled, the probability of enabling energy saving mechanisms relying on switching off hardware (such as power amplifiers) for short periods of time (e.g., milliseconds) when no data is transmitted is increased. For example:

9.2.1.12 eNB MBMS Configuration Data Item

This information element provides MBMS related configuration information from the eNB.

| IE/Group Name | Presence | Range | IE type and reference | Semantics description |
|---|---|---|---|---|
| E-UTRAN CGI | M | | 9.2.1.11 | |
| MBSFN Synchronisation Area Id | M | | 9.2.1.20 | |

| IE/Group Name | Presence | Range | IE type and reference | Semantics description |
| --- | --- | --- | --- | --- |
| MBMS Service Area List | | 1 | | |
| >MBMS Service Area Item | | 1 to <maxnoofMBMSServiceAreasPerCell> | | |
| >>MBMS Service Area | M | | 9.2.3.6 | |
| Sleep Mode Supported | O | 1 | | Present if the sleep mode is supported |
| >Cell Activity State | O | | ENUMERATED (active, dormant, . . .) | |
| > Change Sleep Level | O | | INTEGER(1 . . . maxnoofSleepGroupLevels) | Wanted sleep level |

Figure 7:
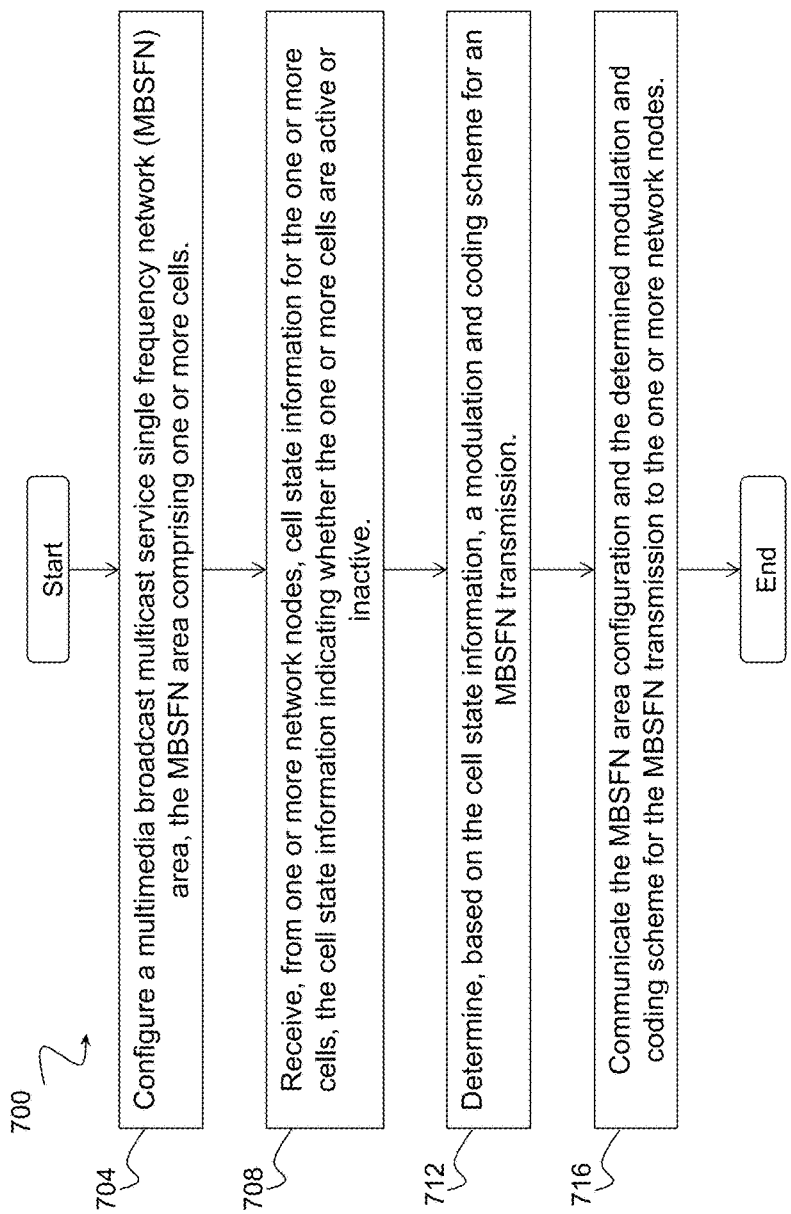
FIG. 7 is a flow diagram of a method in a multicast coordination entity, in accordance with certain embodiments.

FIG. 7 is a flow diagram of a method 700 in a multicast coordination entity, in accordance with an embodiment. The method begins at step 704, where the MCE configures a multimedia broadcast multicast service single frequency network (MBSFN) area, the MBSFN area comprising one or more cells. At step 708, the MCE receives, from one or more network nodes, cell state information for the one or more cells, the cell state information indicating whether the one or more cells are active or inactive.

In certain embodiments, the method may further comprise sending a cell activity logging request to the one or more network nodes, the cell activity logging request requesting the one or more network nodes to begin logging cell state information for the one or more cells. The method may further comprise sending a logging results request to the one or more network nodes, the logging results request requesting the one or more network nodes to send the cell state information for the one or more cells to the multicast coordination entity.

At step 712, the MCE determines, based on the cell state information, a modulation and coding scheme for an MBSFN transmission. At step 716, the MCE communicates the MBSFN area configuration and the determined modulation and coding scheme for the MBSFN transmission to the one or more network nodes.

In certain embodiments, the method may further comprise informing an application layer server about the one or more cells in the MBSFN area that will potentially participate in the MBSFN transmission, regardless of whether they are active or dormant. In certain embodiments, the method may further comprise determining one or more subsets of cells within the MBSFN area, each of the determined one or more subsets of cells within the MBSFN area having an associated sleep group level, and communicating an allowed sleep group level to the one or more network nodes, the allowed sleep group level indicating an allowed sleep group, the allowed sleep group comprising one or more of the determined one or more subsets of cells within the MBSFN area that can be deactivated.

The method may further comprise configuring one or more cells not included in the allowed sleep group to participate in the MBSFN transmission while being otherwise deactivated. In some cases, the allowed sleep group level communicated to the one or more network nodes may comprise a first sleep group level, and the method may further comprise receiving, from one or more of the network nodes, one or more requests to change the allowed sleep group level from the first sleep group level to a second sleep group level. In some cases, the first sleep group level may be associated with a first subset of cells within the MBSFN area and the first sleep group level may indicate that the first subset of cells within the MBSFN area can be deactivated. The second sleep group level may be associated with a second subset of cells within the MBSFN area and the second sleep group level may indicate that both the second subset of cells within the MBSFN area and the first subset of cells within the MBSFN area can be deactivated. The method may further comprise communicating, to the one or more network nodes, the second sleep group level as the allowed sleep group level in response to the received one or more requests to change the allowed sleep group level from the first sleep group level to the second sleep group level.

Figure 8:
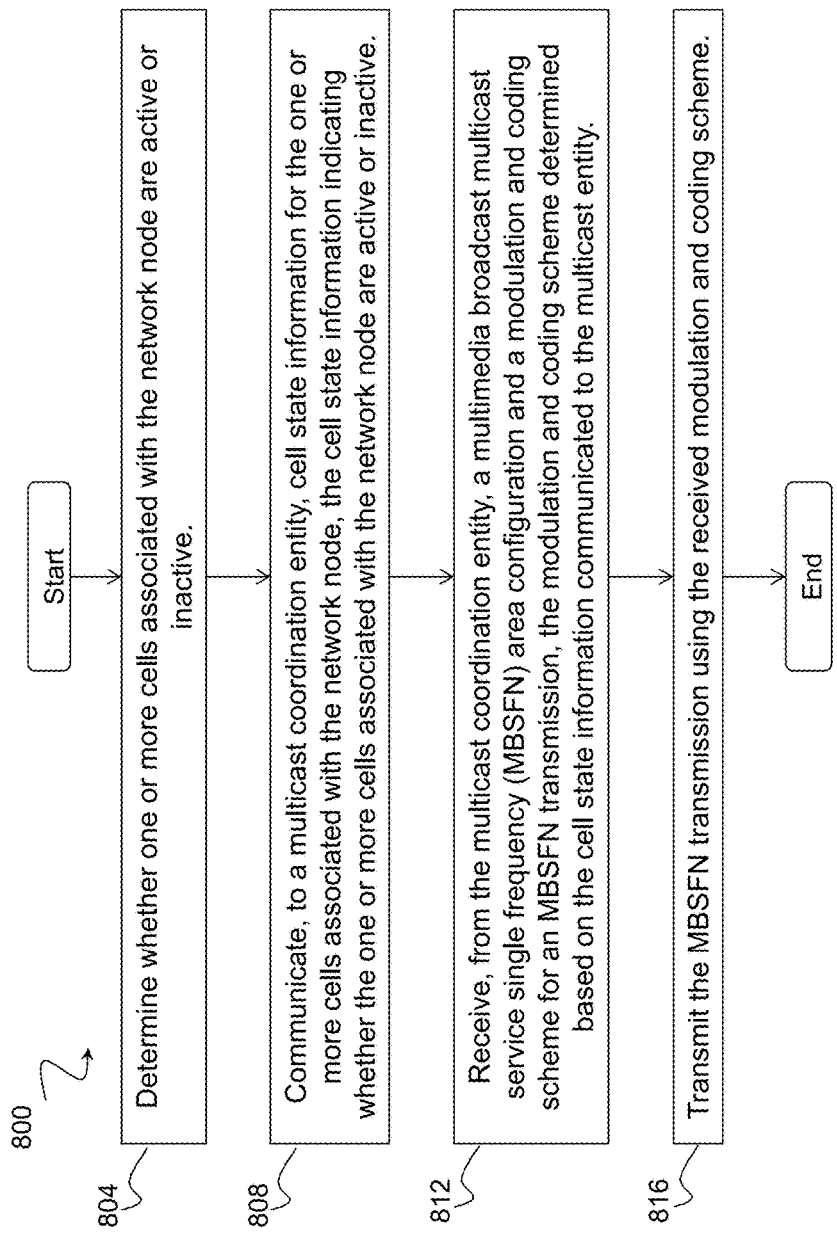
FIG. 8 is a flow diagram of a method in a network node, in accordance with certain embodiments.

FIG. 8 is a flow diagram of a method 800 in a network node, in accordance with certain embodiments. The method begins at step 804, where the network node determines whether one or more cells associated with the network node are active or inactive. At step 808, the network node communicates, to an MCE, cell state information for the one or more cells associated with the network node, the cell state information indicating whether the one or more cells associated with the network node are active or inactive.

In certain embodiments, the method may further comprise receiving a cell activity logging request from the multicast coordination entity, the cell activity logging request requesting the network node to begin logging cell state information for the one or more cells associated with the network node. The method may further comprise receiving a logging results request from the MCE, the logging results request requesting the one or more network nodes to send the logged cell state information for the one or more cells to the MCE, and sending the logged cell state information to the MCE in response to the received logging results request.

At step 812, the network node receives, from the MCE, a multimedia broadcast multicast service single frequency (MBSFN) area configuration and a modulation and coding scheme for an MBSFN transmission, the modulation and coding scheme determined based on the cell state information communicated to the MCE.

At step 816, the network node transmits the MBSFN transmission using the received modulation and coding scheme.

In certain embodiments, the method may further comprise receiving, from the MCE, an allowed sleep group level, the allowed sleep group level indicating an allowed sleep group, the allowed sleep group comprising one or more subsets of cells within the MBSFN area that can be deactivated. The method may further comprise deactivating one or more cells of the one or more cells associated with the network node, the deactivated one or more cells included in at least one of the one or more subsets of cells included in the allowed sleep group. In some cases, the received allowed sleep group level may comprise a first sleep group level, and the method may further comprise communicating, to the MCE, a request to change the allowed sleep group level from the first sleep group level to a second sleep group level. The first sleep group level may be associated with a first subset of cells within the MBSFN area and the first sleep group level may indicate that the first subset of cells within the MBSFN area can be deactivated. The second sleep group level may be associated with a second subset of cells within the MBSFN area and the second sleep group level may indicate that both the second subset of cells within the MBSFN area and the first subset of cells within the MBSFN area can be deactivated. In certain embodiments, the method may further comprise receiving, from the MCE, the second sleep group level as the allowed sleep group level in response to the communicated request to change the allowed sleep group level from the first sleep group level to the second sleep group level, and deactivating one or more cells of the one or more cells associated with the network node, the deactivated one or more cells included in at least one of the first subset of cells associated with the first sleep group level and the second subset of cells associated with the second sleep group level.

Figure 9:
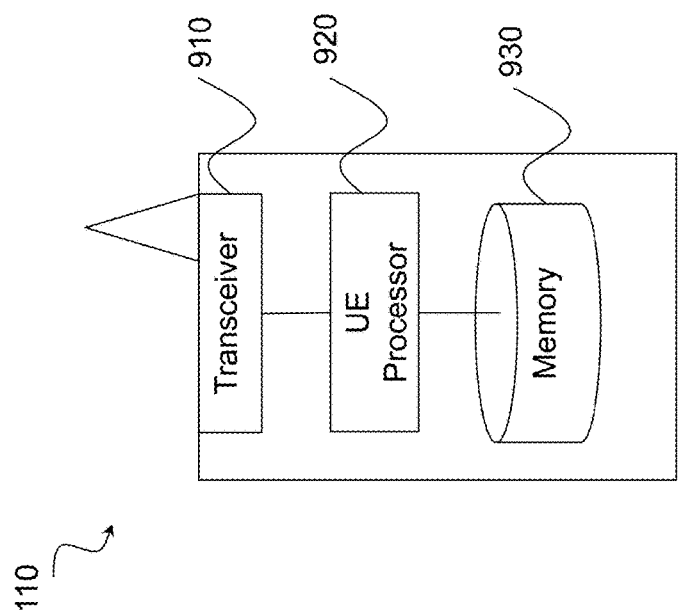
FIG. 9 is a block schematic of an exemplary wireless device, in accordance with certain embodiments.

FIG. 9 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via an antenna), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 920.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
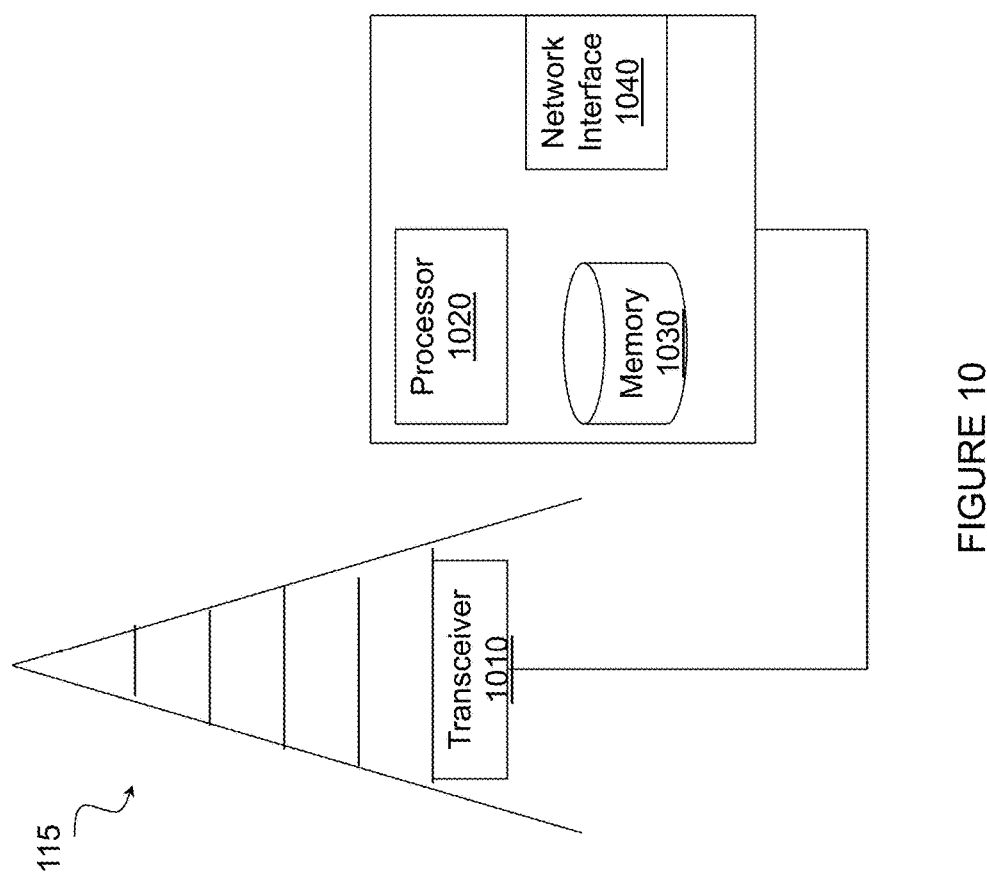
FIG. 10 is a block schematic of an exemplary network node, in accordance with certain embodiments.

FIG. 10 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via an antenna), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers 130, etc.

Processor 1020 may include any suitable combination of hardware and software implemented in one or more modules to execute instructions and manipulate data to perform some or all of the described functions of network node 115, such as those described above in relation to FIGS. 1-8 above. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
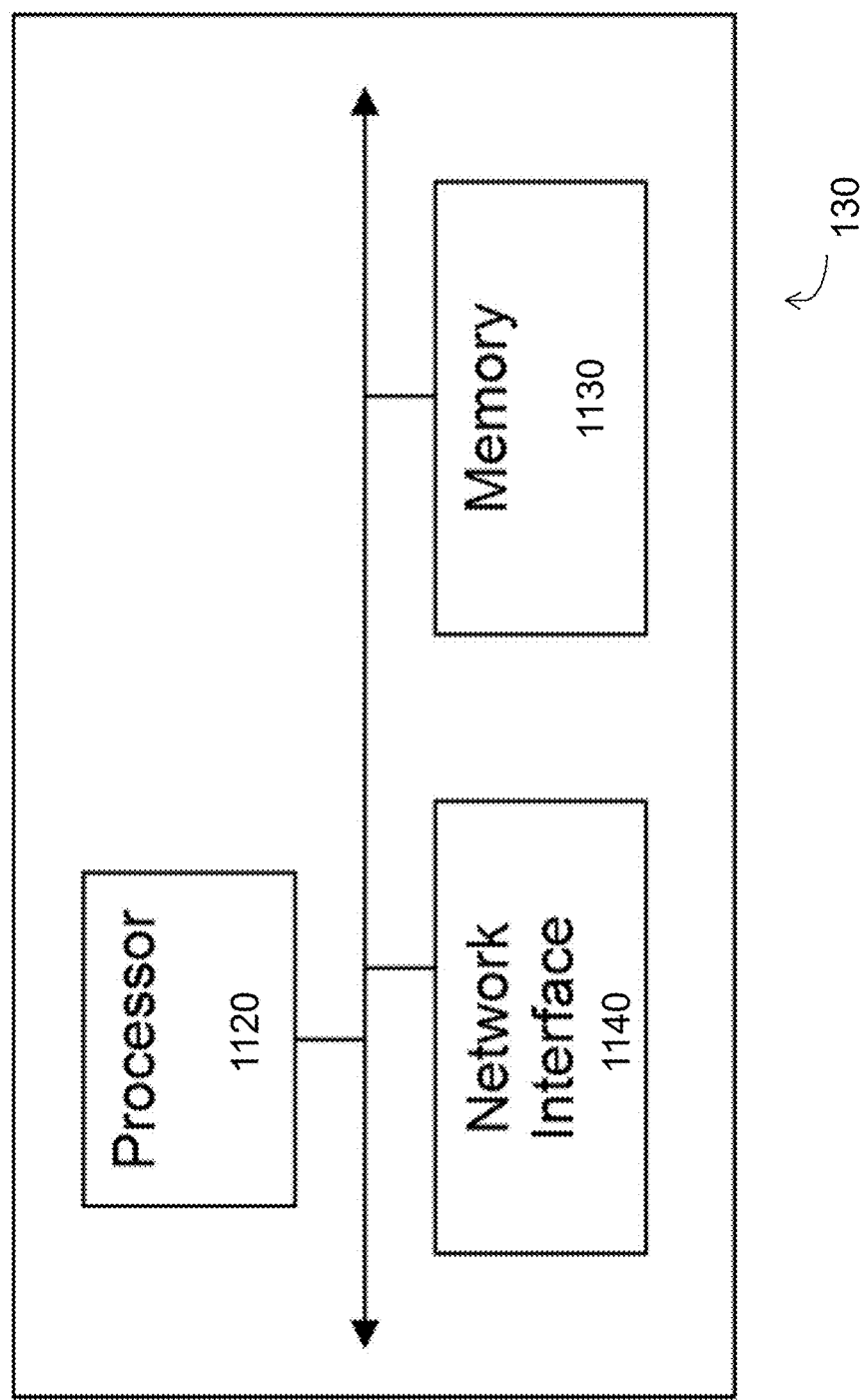
FIG. 11 is a block schematic of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
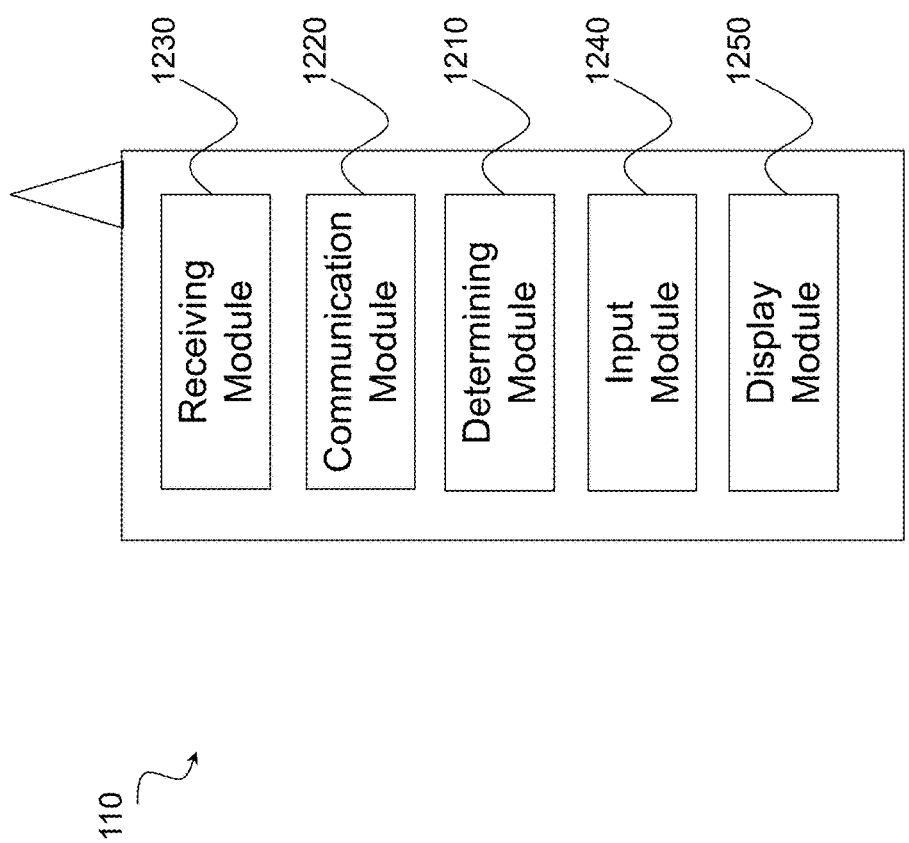
FIG. 12 is a block schematic of an exemplary wireless device, in accordance with certain embodiments.

FIG. 12 is a block schematic of an exemplary wireless device, in accordance with certain embodiments. Wireless device 110 may include one or more modules. For example, wireless device 110 may include a determining module 1210, a communication module 1220, a receiver module 1230, an input module 1240, a display module 1250, and any other suitable modules. In certain embodiments, wireless device 110 may be configured to perform any of the functionality described above in relation to FIGS. 1-8 as being performed by a wireless device.

Determining module 1210 may perform the processing functions of wireless device 110. Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 described above may, in certain embodiments, be performed in one or more distinct modules.

Communication module 1220 may perform the transmission functions of wireless device 110. Communication module 1220 may transmit messages to one or more of network nodes 115 of network 100. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210.

Receiving module 1230 may perform the receiving functions of wireless device 110. Receiving module 1230 may include a receiver and/or a transceiver. Receiving module 1230 may include circuitry configured to wirelessly receive messages and/or signals. In particular embodiments, receiving module 1230 may communicate received messages and/or signals to determining module 1210.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210.

Display module 1250 may present signals on a display of wireless device 110. Display module 1250 may include the display and/or any appropriate circuitry and hardware configured to present signals on the display. Display module 1250 may receive signals to present on the display from determining module 1210.

Determining module 1210, communication module 1220, receiving module 1230, input module 1040, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
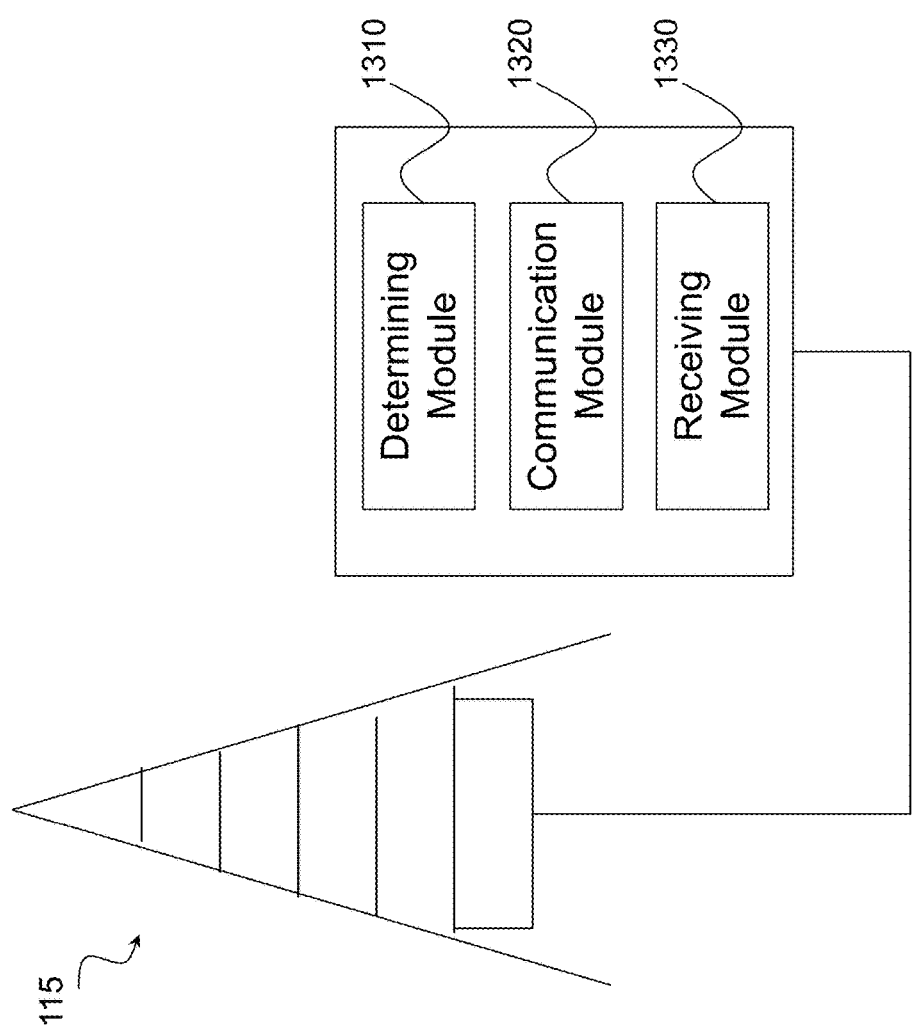
FIG. 13 is a block schematic of an exemplary network node, in accordance with certain embodiments.

FIG. 13 is a block schematic of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processor 1020 described above in relation to FIG. 10. In certain embodiments, the functions of two or more of the various modules may be combined into a single module. In certain embodiments, network node 115 may be configured to perform any of the functionality described above in relation to FIGS. 1-8 as being performed by a multicast coordination entity or a network node.

Determining module 1310 may perform the processing functions of network node 115. In certain embodiments, network node 115 may include a multicast coordination entity, such as MCE 305 above, and determining module 1310 may perform the functions of the multicast coordination entity described above with respect to FIGS. 1-8. For example, determining module 1310 may configure an MBSFN area comprising one or more cells. As another example, determining module 1310 may determine, based on received cell state information (e.g., from one or more network nodes), a modulation and coding scheme for an MBSFN transmission. As still another example, determining module 1310 may determine one or more subsets of cells within the MBSFN area, each of the determined one or more subsets of cells within the MBSFN area having an associated sleep group level. As yet another example, determining module 1310 may configure one or more cells not included in the allowed sleep group to participate in the MBSFN transmission while being otherwise deactivated.

In certain embodiments, determining module 1310 may perform the functions of network node 115 described above with respect to FIGS. 1-8. For example, determining module 1310 may determine whether one or more cells associated with network node 115 are active or inactive. As another example, determining module 1310 may deactivate one or more cells of the one or more cells associated with network node 115, the deactivated one or more cells included in at least one of the one or more subsets of cells included in the allowed sleep group.

Determining module 1310 may include or be included in one or more processors, such as processor 1020 described above in relation to FIG. 10. Determining module 1310 may include analog and/or digital circuitry configured to perform any of the functions of determining module 1310 and/or processor 1020 described above. The functions of determining module 1310 may, in certain embodiments, be performed in one or more distinct modules.

Communication module 1320 may perform the transmission functions of network node 115. In certain embodiments, network node 115 may include a multicast coordination entity, such as MCE 305 above, and communication module 1320 may perform the functions of the multicast coordination entity described above with respect to FIGS. 1-8. For example, communication module 1320 may communicate the MBSFN area configuration and the determined modulation and coding scheme for the MBSFN transmission to one or more network nodes 115. As another example, communication module 1320 may send a cell activity logging request to one or more network nodes 115 requesting the one or more network nodes to begin logging cell state information for the one or more cells. As still another example, communication module 1320 may send a logging results request to the one or more network nodes, the logging results request requesting the one or more network nodes to send the cell state information for the one or more cells to the multicast coordination entity. As yet another example, communication module 1320 may communicate an allowed sleep group level to the one or more network nodes, the allowed sleep group level indicating an allowed sleep group, the allowed sleep group comprising one or more of the determined one or more subsets of cells within the MBSFN area that can be deactivated. In some cases, communication module 1320 may inform an application layer server about the one or more cells in the MBSFN area that will potentially participate in the MBSFN transmission regardless of whether they are active or dormant.

In certain embodiments, communication module 1320 may perform the functions of network node 115 described above with respect to FIGS. 1-8. For example, communication module 1320 may communicate, to a multicast coordination entity, cell state information for the one or more cells associated with the network node, the cell state information indicating whether the one or more cells associated with network node 115 are active or inactive. As another example, communication module 1320 may transmit the MBSFN transmission using the received modulation and coding scheme. As still another example, communication module 1320 may send the logged cell state information to the multicast coordination entity in response to the received logging results request. As yet another example, communication module 1320 may communicate, to the multicast coordination entity, a request to change the allowed sleep group level from the first sleep group level to a second sleep group level.

Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module.

Receiving module 1330 may perform the receiving functions of network node 115. In certain embodiments, network node 115 may include a multicast coordination entity, such as MCE 305 above, and receiving module 1330 may perform the functions of the multicast coordination entity described above with respect to FIGS. 1-8. For example, receiving module 1330 may receive, from one or more network nodes 115, cell state information for the one or more cells, the cell state information indicating whether the one or more cells are active or inactive. As another example, receiving module 1330 may receive, from one or more of network nodes 115, one or more requests to change the allowed sleep group level from the first sleep group level to a second sleep group level.

In certain embodiments, receiving module 1330 may perform the functions of network node 115 described above with respect to FIGS. 1-8. For example, receiving module 1330 may receive, from the multicast coordination entity, an MBSFN area configuration and a modulation and coding scheme for an MBSFN transmission, the modulation and coding scheme determined based on the cell state information communicated to the multicast coordination entity. As another example, receiving module 1330 may receive a cell activity logging request from the multicast coordination entity, the cell activity logging request requesting network node 115 begin logging cell state information for the one or more cells associated with network node 115. As still another example, receiving module 1330 may receive a logging results request from the multicast coordination entity, the logging results request requesting network node 115 send the logged cell state information for the one or more cells to the multicast coordination entity. As yet another example, receiving module 1330 may receive, from the multicast coordination entity, an allowed sleep group level, the allowed sleep group level indicating an allowed sleep group, the allowed sleep group comprising one or more subsets of cells within the MBSFN area that can be deactivated.

Receiving module 1330 may receive any suitable information from a wireless device. Receiving module 1330 may include a receiver and/or a transceiver. Receiving module 1330 may include circuitry configured to wirelessly receive messages and/or signals. In particular embodiments, receiving module 1330 may communicate received messages and/or signals to determining module 1310 or any other suitable module.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

As noted above, in some cases the multicast coordination entity may be deployed as a separate physical entity (or in a physical entity other than network node 115). In such a case, the multicast coordination entity would include the various modules described above in connection with network node 115 (including determining module 1310, communication module 1320, and receiving module 1330) and would be capable of performing the various functionalities described above with respect to FIG. 13.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AAS Active Antenna Systems
DM Domain Manager
E-UTRAN Evolved UTRAN
ECGI E-UTRAN Cell Global Identifier
MBMS Multimedia Broadcast/Multicast Service
MCCH Multicast Control Channel
MCE Multi-Cell/Multicast Coordination Entity
MCS Modulation and Coding Scheme
MTCH Multicast Traffic Channel
NE Node Element
NM Network Manager
PCI Physical Cell Identity
SFN Single Frequency Network
SON Self-Organizing Network
OSS Operation and Support System
RAN Radio Access Network
UE User Equipment
UTRAN Universal Terrestrial RAN

The invention claimed is:

1. A method in a multicast coordination entity, the method comprising:
configuring a multimedia broadcast multicast service single frequency network (MBSFN) area, the MBSFN area comprising one or more cells;
receiving, from one or more network nodes, cell state information for the one or more cells, the cell state information indicating whether the one or more cells are active or inactive;
determining, based on the cell state information, a modulation and coding scheme for an MBSFN transmission;
communicating the MBSFN area configuration and the determined modulation and coding scheme for the MBSFN transmission to the one or more network nodes;
determining one or more subsets of cells within the MBSFN area, each of the determined one or more subsets of cells within the MBSFN area having an associated sleep group level; and
communicating an allowed sleep group level to the one or more network nodes, the allowed sleep group level indicating an allowed sleep group, the allowed sleep group comprising one or more of the determined one or more subsets of cells within the MBSFN area that can be deactivated.

2. The method of claim 1, further comprising:
sending a cell activity logging request to the one or more network nodes, the cell activity logging request requesting the one or more network nodes to begin logging cell state information for the one or more cells; and
sending a logging results request to the one or more network nodes, the logging results request requesting the one or more network nodes to send the cell state information for the one or more cells to the multicast coordination entity.

3. The method of claim 1, further comprising:
configuring one or more cells not included in the allowed sleep group to participate in the MBSFN transmission while being otherwise deactivated.

4. The method of claim 1, wherein the allowed sleep group level communicated to the one or more network nodes comprises a first sleep group level, and the method further comprises:
receiving, from one or more of the network nodes, one or more requests to change the allowed sleep group level from the first sleep group level to a second sleep group level.

5. The method of claim 4, wherein:
the first sleep group level is associated with a first subset of cells within the MBSFN area and the first sleep group level indicates that the first subset of cells within the MBSFN area can be deactivated; and
the second sleep group level is associated with a second subset of cells within the MBSFN area and the second sleep group level indicates that both the second subset of cells within the MBSFN area and the first subset of cells within the MBSFN area can be deactivated.

6. The method of claim 4, further comprising:
communicating, to the one or more network nodes, the second sleep group level as the allowed sleep group level in response to the received one or more requests to change the allowed sleep group level from the first sleep group level to the second sleep group level.

7. The method of claim 1, further comprising:
informing an application layer server about the one or more cells in the MBSFN area that will potentially participate in the MBSFN transmission, regardless of whether they are active or dormant.

8. A method in a network node, the method comprising:
determining whether one or more cells associated with the network node are active or inactive;
communicating, to a multicast coordination entity (MCE), cell state information for the one or more cells associated with the network node, the cell state information indicating whether the one or more cells associated with the network node are active or inactive;
receiving, from the multicast coordination entity, a multimedia broadcast multicast service single frequency (MBSFN) area configuration and a modulation and coding scheme for an MBSFN transmission, the modulation and coding scheme determined based on the cell state information communicated to the multicast coordination entity;
transmitting the MBSFN transmission using the received modulation and coding scheme; and
receiving, from the multicast coordination entity, an allowed sleep group level, the allowed sleep group level indicating an allowed sleep group, the allowed sleep group comprising one or more subsets of cells within the MBSFN area that can be deactivated.

9. The method of claim 8, further comprising:
receiving a cell activity logging request from the multicast coordination entity, the cell activity logging request requesting the network node to begin logging cell state information for the one or more cells associated with the network node;
receiving a logging results request from the multicast coordination entity, the logging results request requesting the one or more network nodes to send the logged cell state information for the one or more cells to the multicast coordination entity; and
sending the logged cell state information to the multicast coordination entity in response to the received logging results request.

10. The method of claim 8, further comprising:
deactivating one or more cells of the one or more cells associated with the network node, the deactivated one or more cells included in at least one of the one or more subsets of cells included in the allowed sleep group.

11. The method of claim 8, wherein the received allowed sleep group level comprises a first sleep group level, and the method further comprises:
communicating, to the multicast coordination entity, a request to change the allowed sleep group level from the first sleep group level to a second sleep group level.

12. The method of claim 11, wherein:
the first sleep group level is associated with a first subset of cells within the MBSFN area and the first sleep group level indicates that the first subset of cells within the MBSFN area can be deactivated; and
the second sleep group level is associated with a second subset of cells within the MBSFN area and the second sleep group level indicates that both the second subset of cells within the MBSFN area and the first subset of cells within the MBSFN area can be deactivated.

13. The method of claim 11, further comprising:
receiving, from the multicast coordination entity, the second sleep group level as the allowed sleep group level in response to the communicated request to change the allowed sleep group level from the first sleep group level to the second sleep group level; and
deactivating one or more cells of the one or more cells associated with the network node, the deactivated one or more cells included in at least one of the first subset of cells associated with the first sleep group level and the second subset of cells associated with the second sleep group level.

14. A multicast coordination entity, comprising:
one or more processors, the one or more processors configured to:
configure a multimedia broadcast multicast service single frequency network (MBSFN) area, the MBSFN area comprising one or more cells;
receive, from one or more network nodes, cell state information for the one or more cells, the cell state information indicating whether the one or more cells are active or inactive;
determine, based on the cell state information, a modulation and coding scheme for an MBSFN transmission;
communicate the MBSFN area configuration and the determined modulation and coding scheme for the MBSFN transmission to the one or more network nodes;
determine one or more subsets of cells within the MBSFN area, each of the determined one or more subsets of cells within the MBSFN area having an associated sleep group level; and
communicate an allowed sleep group level to the one or more network nodes, the allowed sleep group level indicating an allowed sleep group, the allowed sleep group comprising one or more of the determined one or more subsets of cells within the MBSFN area that can be deactivated.

15. The multicast coordination entity of claim 14, wherein the one or more processors are further configured to:

send a cell activity logging request to the one or more network nodes, the cell activity logging request requesting the one or more network nodes to begin logging cell state information for the one or more cells; and send a logging results request to the one or more network nodes, the logging results request requesting the one or more network nodes to send the cell state information for the one or more cells to the multicast coordination entity.

16. The multicast coordination entity of claim 14, wherein the one or more processors are further configured to:
configure one or more cells not included in the allowed sleep group to participate in the MBSFN transmission while being otherwise deactivated.

17. The multicast coordination entity of claim 14, wherein the allowed sleep group level communicated to the one or more network nodes comprises a first sleep group level, and the one or more processors are further configured to:
receive, from one or more of the network nodes, one or more requests to change the allowed sleep group level from the first sleep group level to a second sleep group level.

18. The multicast coordination entity of claim 17, wherein:
the first sleep group level is associated with a first subset of cells within the MBSFN area and the first sleep group level indicates that the first subset of cells within the MBSFN area can be deactivated; and
the second sleep group level is associated with a second subset of cells within the MBSFN area and the second sleep group level indicates that both the second subset of cells within the MBSFN area and the first subset of cells within the MBSFN area can be deactivated.

19. The multicast coordination entity of claim 17, wherein the one or more processors are further configured to:
communicate, to the one or more network nodes, the second sleep group level as the allowed sleep group level in response to the received one or more requests to change the allowed sleep group level from the first sleep group level to the second sleep group level.

20. The multicast coordination entity of claim 14, wherein the one or more processors are further configured to:
inform an application layer server about the one or more cells in the MBSFN area that will potentially participate in the MBSFN transmission regardless of whether they are active or dormant.

21. A network node, comprising:
one or more processors, the one or more processors configured to:
determine whether one or more cells associated with the network node are active or inactive;
communicate, to a multicast coordination entity (MCE), cell state information for the one or more cells associated with the network node, the cell state information indicating whether the one or more cells associated with the network node are active or inactive;
receive, from the multicast coordination entity, a multimedia broadcast multicast service single frequency (MBSFN) area configuration and a modulation and coding scheme for an MBSFN transmission, the modulation and coding scheme determined based on the cell state information communicated to the multicast coordination entity;
transmit the MBSFN transmission using the received modulation and coding scheme; and
receive, from the multicast coordination entity, an allowed sleep group level, the allowed sleep group level indicating an allowed sleep group, the allowed sleep group comprising one or more subsets of cells within the MBSFN area that can be deactivated.

22. The network node of claim 21, wherein the one or more processors are further configured to:
receive a cell activity logging request from the multicast coordination entity, the cell activity logging request requesting the network node to begin logging cell state information for the one or more cells associated with the network node;
receive a logging results request from the multicast coordination entity, the logging results request requesting the one or more network nodes to send the logged cell state information for the one or more cells to the multicast coordination entity; and
send the logged cell state information to the multicast coordination entity in response to the received logging results request.

23. The network node of claim 21, wherein the one or more processors are further configured to:
deactivate one or more cells of the one or more cells associated with the network node, the deactivated one or more cells included in at least one of the one or more subsets of cells included in the allowed sleep group.

24. The network node of claim 21, wherein the received allowed sleep group level comprises a first sleep group level, and the one or more processors are further configured to:
communicate, to the multicast coordination entity, a request to change the allowed sleep group level from the first sleep group level to a second sleep group level.

25. The network node of claim 24, wherein:
the first sleep group level is associated with a first subset of cells within the MBSFN area and the first sleep group level indicates that the first subset of cells within the MBSFN area can be deactivated; and
the second sleep group level is associated with a second subset of cells within the MBSFN area and the second sleep group level indicates that both the second subset of cells within the MBSFN area and the first subset of cells within the MBSFN area can be deactivated.

26. The network node of claim 24, wherein the one or more processors are further configured to:
receive, from the multicast coordination entity, the second sleep group level as the allowed sleep group level in response to the communicated request to change the allowed sleep group level from the first sleep group level to the second sleep group level; and
deactivate one or more cells of the one or more cells associated with the network node, the deactivated one or more cells included in at least one of the first subset of cells associated with the first sleep group level and the second subset of cells associated with the second sleep group level.

* * * * *